US008332919B2

(12) United States Patent
Gomi et al.

(10) Patent No.: US 8,332,919 B2
(45) Date of Patent: Dec. 11, 2012

(54) DISTRIBUTED AUTHENTICATION SYSTEM AND DISTRIBUTED AUTHENTICATION METHOD

(75) Inventors: Hidehito Gomi, Tokyo (JP); Makoto Hatakeyama, Tokyo (JP); Shigeru Hosono, Tokyo (JP)

(73) Assignee: NEC Corporation, Tokyo (JP)

( * ) Notice: Subject to any disclaimer, the term of this patent is extended or adjusted under 35 U.S.C. 154(b) by 1088 days.

(21) Appl. No.: 12/224,095

(22) PCT Filed: Feb. 14, 2007

(86) PCT No.: PCT/JP2007/052632
§ 371 (c)(1),
(2), (4) Date: Aug. 18, 2008

(87) PCT Pub. No.: WO2007/094369
PCT Pub. Date: Aug. 23, 2007

(65) Prior Publication Data
US 2009/0055904 A1      Feb. 26, 2009

(30) Foreign Application Priority Data

Feb. 17, 2006  (JP) .................................. 2006-041099

(51) Int. Cl.
*H04L 29/06*      (2006.01)

(52) U.S. Cl. ........................................... 726/6; 713/168

(58) Field of Classification Search ............... 713/168, 713/169, 170, 182, 183, 155; 726/2, 3, 4, 726/5, 6, 7, 17, 18, 19, 21, 16, 28, 29; 709/201, 709/202, 203
See application file for complete search history.

(56) References Cited

U.S. PATENT DOCUMENTS

| 6,587,880 B1 | 7/2003 | Saigo et al. |
| 2005/0039054 A1* | 2/2005 | Satoh et al. .................. 713/201 |

FOREIGN PATENT DOCUMENTS

| JP | 11-212912 | 8/1999 |
| JP | 2004-201288 | 7/2004 |
| JP | 2004-362189 | 12/2004 |
| JP | 2006-50123 | 2/2006 |
| WO | WO 2004/045224 | 5/2004 |

OTHER PUBLICATIONS

Cahill Conor P., et al., "Assertions and Protocols for the OASIS Security Assertion Markup Language" OASIS, vol. 2, Mar. 15, 2005.

* cited by examiner

*Primary Examiner* — Gilberto Barron, Jr.
*Assistant Examiner* — Izunna Okeke
(74) *Attorney, Agent, or Firm* — McGinn IP Law Group, PLLC

(57) ABSTRACT

[Subject] In a distributed authentication system, if a terminal including a plurality of communication devices changes a communication device to another communication device during using a service, the service under use can be used in succession, and the number of times for execution by the user can reduced.
[Solving Means] An authentication-information management unit (5) registers authentication information of the user authenticated by each authentication unit (4), and allows sharing of said authentication information. A session-information management device (24) of a service providing unit (2) manages session information including a session identifier of a session established between the same and the terminal unit (3). More specifically, the service providing unit 2 performs individualized management of sessions established between the same and the terminal unit (3). The session-information management device (24) achieves a continuous provision of the service by authorization of provision of the service to the terminal unit (3) based on the individualized management of said session information.

10 Claims, 23 Drawing Sheets

FIG. 19

| AUTHENTICATION UNIT | TERMINAL ID | AUTHENTICATION-INFORMATION ID |
|---|---|---|
| AUTHENTICATION UNIT 202 | ABCD-1000 | ASSERTION-001 |
| | | |

| USER ID | SESSION ID | TERMINAL ID |
|---|---|---|
| smith | IdP202-0001 | ABCD-1000 |
| | | |

| USER ID | SESSION ID | AUTHENTICATION-INFORMATION ID |
|---|---|---|
| john | SP201-0001 | ASSERTION-001 |
| | | |

| UNIT | SESSION ID | TERMINAL ID |
|---|---|---|
| AUTHENTICATION UNIT 202 | IdP202-0001 | ABCD-1000 |
| SERVICE PROVIDING UNIT 201 | SP201-0001 | — |

| USER ID | SESSION ID | TERMINAL ID |
|---|---|---|
| smith2 | IdP204-0010 | ABCD-1000 |
|  |  |  |

FIG. 25

| USER ID | SESSION ID | AUTHENTICATION-INFORMATION ID |
|---|---|---|
| john | SP201-0002 | ASSERTION-002 |
|  |  |  |

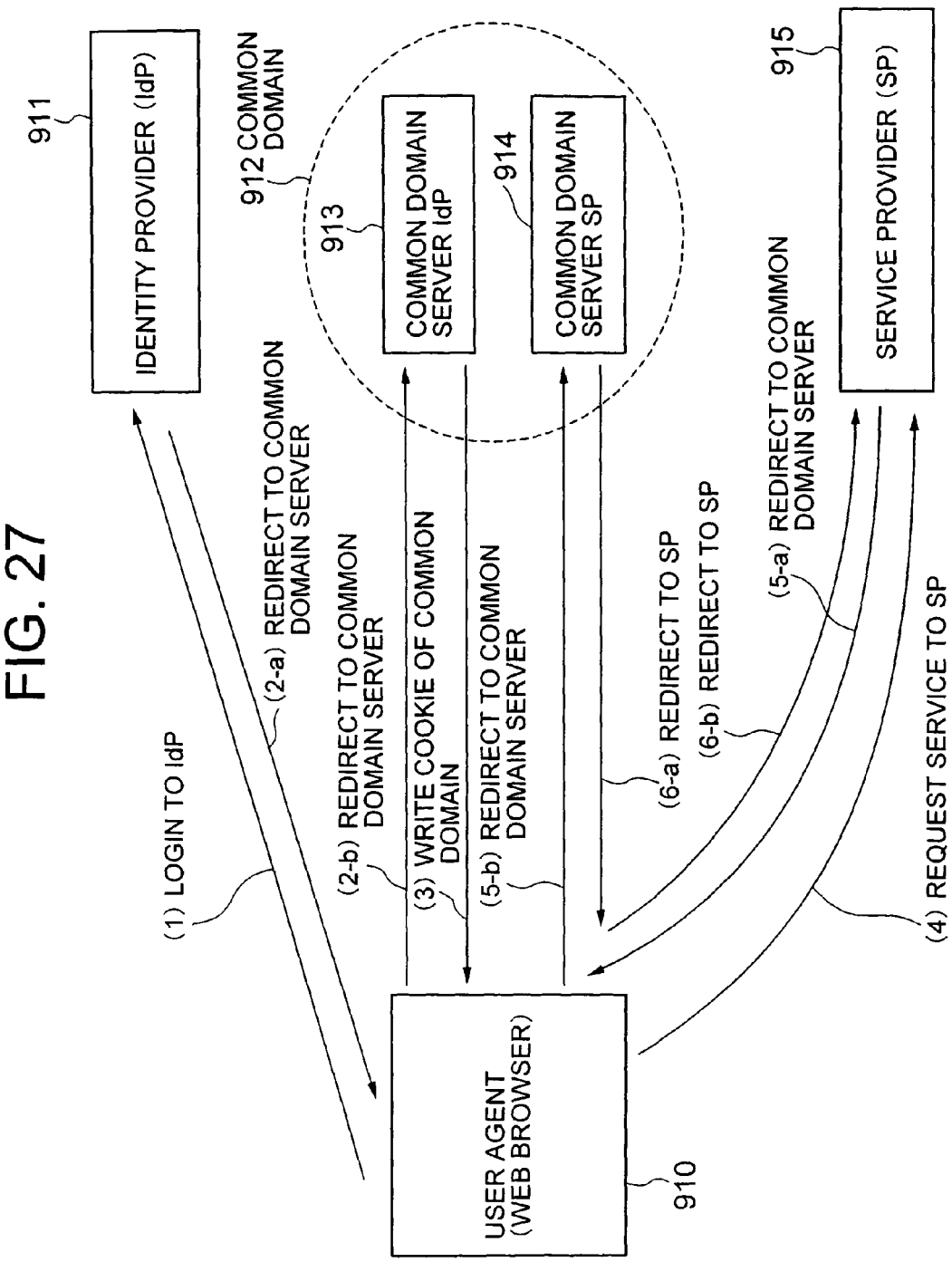

DISTRIBUTED AUTHENTICATION SYSTEM AND DISTRIBUTED AUTHENTICATION METHOD

TECHNICAL FIELD

The present invention relates to a distributed authentication system and a distributed authentication method for performing distributed authentication of a user and, more particularly, to a distributed authentication system and a distributed authentication method which are capable of reducing the number of times of execution for the user authentication needed in the case of accessing from a terminal including a plurality of communication devices and allowing a continued use of a service. The present invention also relates to a service providing unit and an authentication-information management unit included in the distributed authentication system. Further, the present invention relates to a service-providing-unit-applicable program, a terminal-unit-applicable program, an authentication-unit-applicable program, and an authentication-information-management-unit-applicable program, which are used in the distributed authentication system.

BACKGROUND ART

Recently, a variety of apparatuses, such as personal computer (PC), portable telephone, PDA and network-applicable household appliance, have emerged which have a higher-performance processing function and a communication function. These apparatuses are capable of receiving a variety of services via wired and wireless networks while using a variety of communication systems. Along with this emergence, it has become important on the security aspect for a service provider providing services via the network to authenticate the user of a terminal that is accessed via the network.

Upon authentication of the user of a terminal, it is usual that each service provider authenticates the user by respective different authentication systems. Therefore, if the user wishes to receive a variety of services as described above, the user is requested to have an authentication thereof each time the user receives the service, whereby it takes a long time and thus inconvenient for the user to perform the authentication processing.

Conventional techniques for solving the problem that authentication is needed for every service include one that allows service providers to exchange the authentication information therebetween on the Internet by using markup languages, such as SAML (security assertion markup language) and is prescribed in a technological specification. For example, SAML described in "Assertions and Protocols for the OASIS Security Assertion Markup Language (SAML) V2.0", [online], Mar. 15, 2005, OASIS [searched on Sep. 20, 1995], Internet <URL: HYPERLINK "http://docs.oasis-open.org/security/saml/v2.0/saml-core-2.0-os.pdf" (Non-Patent Document) may be used to achieve the distributed authentication system.

FIG. 26 shows a flow of messages for achieving a single-sign-on in the conventional distributed authentication system using the SAML described in the Non-Patent Document. In the distributed authentication system using the SAML described in the Non-Patent Document, an IdP (identity provider) 900, a SP (service provider) 901, and a user agent (software of the user terminal) 902 are connected together via the Internet. Specifically, IdP 900 and SP 901 are realized by a server and a database that are managed by each provider. Although an expression that the user agent 902 performs login etc. is used hereinafter, the user terminal actually performs a processing according to the user agent 902 that is configured by software.

A procedure for exchanging messages during the single-sign-on will be described in the case of using an artifact profile of a WebSSO protocol, as a typical operation of the distributed authentication system that uses the SAML described in the Non-Patent Document and has the configuration shown in FIG. 26. The example shown in FIG. 26 premises that account of the user of the user agent 902 is entered beforehand into user information 903 of the database managed by IdP 900, and into user information 904 of the database managed by SP 901. IdP 900 and SP 901 cooperate with each other beforehand to manage both the accounts registered in the user information 903 and user information 904.

As shown in FIG. 26, the user agent 902 receives authentication from IdP 900 according to operation by the user, and logins IdP 900 (step (1)). The user agent 902 also accesses SP 901 according to operation by the user in order to use the service, the use of which is restricted by SP 901 (step (2)).

SP 901 transmits an authentication request message to IdP 900 via the user agent 902 in order to authenticate the user (step (3-*a*)). The user agent 902 redirects (transfers) the certification request message from SP 901 to IdP 900 (step (3-*b*)). Thereafter, IdP 900 acknowledges that the user is already authenticated in a step (1), and creates a XML document (authentication assertion) that attests the user is already authenticated (step (4)).

IdP 900 also creates an artifact that acts as a ticket corresponding to the authentication assertion, and replies the user agent 902 (step (5-*a*)). The user agent 902 redirects (transfers) the artifact to SP 901 (step (5-*b*)). Upon receiving the artifact, SP 901 transmits the same to IdP 900 and requests a corresponding authentication assertion (step (6)).

IdP 900 checks the artifact received from SP 901 and returns the corresponding authentication assertion to SP 901 (step (7)). SP 901 checks validity of the authentication assertion received from IdP 900. SP 901 verifies whether or not the request of access to the service from the user agent 902 is to be permitted by using the security policy in SP 901. If the access is to be permitted, SP 901 starts providing the service to the user agent 902 (step (8)).

As described heretofore, in the distributed authentication system using the SAML described in Non-Patent Document, SP 901 entrusts the authentication function to IdP 900 rather than authenticating the user by itself. SP 901 judges permission or denial for providing the service based on the authentication information of the user received from IdP 900. Therefore, if the user performs only a procedure for authentication to IdP 900, a single-sign-on that allows use of the service of SP 901 is attained. The above procedure reduces the number of times for authentication processing by the user if the user uses a plurality of services, thereby increasing the level of convenience of the user upon using a variety of services.

In the SAML described in Non-Patent Document, a search technique for searching the IdP for identifying the IdP to be used for authentication by the SP is provided, in addition to the technique for single-sign-on as described above. The technique for searching the IdP by using the SAML will be described hereinafter with reference to FIG. 27.

FIG. 27 is an explanatory diagram showing a flow of searching the IdP by using the SAML described in Non-Patent Document. As shown in FIG. 27, IdP 911 and SP 915 manage respective common-domain servers (common-domain server IdP 913 and common-domain server SP 914 in this example) belonging to a common domain 912. If the user agent 910 that is configured a Web browser is authenticated by IdP 911 according to operation by the user (step (1) of FIG. 27), the user agent 910 is redirected (by automated transfer of URL) to the common domain server IdP 913 (step (2-*a*), (2-*b*)). The user agent 910 acquires (receives) from IdP 913 a common-domain-applicable cookie, that describes in a specific format the list of IdPs that have authenticated (step (3)).

Thereafter, if the user agent 910 requests an access to the service by SP 915 (step (4)), SP 915 redirects the user agent 910 (by automated transfer of URL) to the common domain server SP 914 (step (5-*a*), (5-*b*)). The common domain server SP 914 acquires (extracts) the list of IdPs that have authenticated from the cookie data. The common domain server 914 creates a message storing therein list information of the extracted IdPs, and redirects the user agent 910 (by automated transfer of URL) to SP 915 (step (6-*a*), (6-*b*)).

Upon receiving the message from the common domain server 914, SP 915 finds (identifies) IdP 911 out of the list of the IdPs that have authenticated, and acknowledges the fact of being authenticated by IdP 911. If the user is authenticated by a second IdP other than IdP 911 by using the user agent 910, information of the second IdP is described in the common domain cookie as well. Therefore, SP 915 can acquire the list of IdPs that have authenticated the user.

As described heretofore, in the technique for searching the IdP by using the SAML, the SP cooperates with a plurality of IdPs, and uses the common domain cookie on the basis of HTTP, if the user is equally accessible to each IdP. This procedure allows the SP to acquire information of the list of IdPs that have authenticated the user. The information of IdP list thus acquired is available to determine the IdP to which an authentication request is to be transmitted in order to perform the single-sign-on.

Patent Publication JP-2004-362189A describes a user-information distribution system wherein terminals of service providers each providing a service to users are connected to a network and exchange therebetween information on users. In the system described in JP-2004-362189A, the terminal of a first service provider that has authenticated a user enters the user information including authentication information into the user-information distribution system. When the user accesses the terminal of a second service provider, the user-information distribution system provides the user information registered in the user-information distribution system based on environment information, in addition to a public control policy and an information request policy of the user.

As shown above, in the system described in JP-2004-362189A, a plurality of service providers share thereamong the authentication information of the user via the user-information distribution system, whereby it is possible to reduce the number of times for authentication processing by which the service providers authenticate the user.

The specification of Patent Publication JP-3569122B describes a session management system that manages a communication exchanged among a plurality of servers as the same session. In the session management system described in the specification of JP-3569122B, a session identifier is attached to the URL transmitted from a user subjected to user authentication, and a display-data-creation-program controller that received this data notifies a session-management-identifier management unit. The management-identifier management unit, upon recognizing that the session management identifier is installed in the URL thus received, refers to a session-management-identifier management table and investigates whether the session is already authenticated. If it is authenticated, the display-data-creation-program controller provides the service.

In the conventional distribution authentication system using the SAML described in Non-Patent Document and the system described in the specification of JP-3569122B, it is not considered that a single terminal accesses a single service by using a plurality of communication systems. Thus, if the communication system of the terminal is switched when the user uses the service, authentication is again requested. This results in an interruption of the service, or in that the state of using the service before the change of communication system is not succeeded after the change of communication system, whereby a continued service cannot be used. Accordingly, there is a first problem in that if the communication system of the terminal accessing the service is changed in the act of using the service, the session state established during using the service cannot be succeeded.

In the distributed authentication system using the SAML described in Non-Patent Document, if a plurality of authentication agents manage a user, there is no measure to share the user authentication information among those authentication agents. On the other hand, the system described in the conventional technique 1 employs a reference system that introduces the authentication agent by using the common domain cookie under the circumstance where there are a plurality of authentication agents.

However, if the common domain cookie is used, it is premised that the HTTP protocol is used as the communication system, whereby it is necessary for the user terminal to use a Web browser, and also for the authentication agents and service providers to use a HTTP protocol. Therefore, if the system described in the conventional technique 1 is used, the authentication information cannot be exchanged if another communication protocol other than the HTTP is used.

In addition, if the service provider cooperates with a plurality of authentication agents using the above search technique (search technique of the authentication agents using the common domain cookie), the service provider may acquire the list of authentication agents that have authenticated by using the common domain cookie to select a target authentication agent. However, if the service provider needs to fixedly use or select a specific authentication agent, use of the technique for searching the authentication agent does not make sense, whereby the authentication information of the authentication agents is not exchanged therebetween.

In the distributed authentication system described in JP-2004-362189A, a plurality of service providers share thereamong information that identifies individual persons in order to realize the single-sign-on, which may cause a possibility of privacy exposure.

More specifically, in the system described in JP-2004-362189A, it is clearly described that the personal information includes the information such as name or address that can identify the individual person. It is to be noted that if the information fixedly associated with a user is shared among the plurality of service providers, it is possible to correlate the information with the user each time an access from the user occurs, irrespective of whether the information does not identify an individual person in fact.

Therefore, if there are a plurality of authentication agents, there is a second problem in that the procedure of authentication of a user for a plurality of service providers cannot be performed at once in block without depending on the communication system or communication protocol while preventing disclosure of privacy information of the user.

Neither the conventional distributed authentication system using the SAML described in Non-Patent Document, nor the system described in JP-2004-362189A takes into consideration that a terminal used by the user employs a plurality of communication systems and a situation where the user selects one of the communication systems for communication. Thus, there is a third problem in that the user cannot select an optimum communication system when the user is allowed to use a plurality of communication systems.

In the session management system described in the specification of Patent Publication JP-3569122B, first servers share the session information issued by the second server, whereby if a first server once obtains the session information of a user, this information can also be used by another first server. Accordingly, if the session management system described in the specification of Patent Publication JP-3569122B is applied to a heterogeneous environment (that is, environment where a plurality of first servers are managed by respective different providers), takeover of the session (session hijacking) may occur among the different providers.

DISCLOSURE OF THE INVENTION

In view of the above, it is an object of the present invention to provide a distributed authentication system, a service providing unit, an authentication-information management unit, a distributed authentication method, a service-providing-unit-applicable program, a terminal-unit-applicable program, an authentication-unit-applicable program, and an authentication-information-management-unit-applicable program, which are capable of shifting session information without interruption of a service, if a different communication system is used for an access of the service in the act of using the service by using a terminal including a plurality of communication systems.

It is another object of the present invention to provide a distributed authentication system, a service providing unit, an authentication-information management unit, a distributed authentication method, a service-providing-unit-applicable program, a terminal-unit-applicable program, an authentication-unit-applicable program, and an authentication-information-management-unit-applicable program, which are capable of reducing the number of times for executing an authentication processing by a user for a plurality of services without depending on the communication system while protecting the privacy information of the user.

It is another object of the present invention to provide a distributed authentication system, a service providing unit, an authentication-information management unit, a distributed authentication method, a service-providing-unit-applicable program, a terminal-unit-applicable program, an authentication-unit-applicable program, and an authentication-information-management-unit-applicable program, which are capable of providing a service by using a communication system optimum to a user in an environment where the user and the user terminal are located.

The present invention is directed to a distributed authentication system for performing a distributed authentication of a user, including: a terminal unit (for example, terminal unit 3); a service providing unit (for example, service providing unit 2) that provides a specific service to the terminal unit; and an authentication-information management unit (for example, authentication-information management unit 5) that manages authentication information showing a successful authentication of the user of the terminal unit, wherein: the terminal unit includes a plurality of communication devices, and a communication-device selection device (for example, realized by communication-device selection device 31) that selects one of the plurality of communication devices to transmit a service request (for example, service request message) requesting provision of the service to the service providing unit via a communication network; and the service providing unit includes a session-information storage device (for example, realized by session-information storage device 27) that stores therein session information (for example, session information and session identifier) identifying a session established between the terminal unit and the service providing unit upon establishing the session between the terminal unit and the service providing unit, a session-information management device (for example, realized by session-information management device 24) that manages the session information stored in the session-information storage device (for example, realized by session-information storage device 24), and a service authorization device (for example, realized by session-information management device 24) that judges whether or not provision of the service to the terminal unit is to be permitted based on the session information managed by the session-information management device, after the terminal unit switches from a communication device used to establish the session to a different communication device.

The "managing the authentication information" means, for example, storing the authentication information in a specific storage, or retrieving the stored authentication information. The "managing the session information" means, for example, retrieving or updating the stored session information.

The present invention is directed to a distributed authentication system for performing a distributed authentication of a user, including a service providing unit (for example, service providing unit 2), a terminal unit (for example, terminal unit 3), an authentication unit (for example, authentication unit 4), and an authentication-information management unit (for example, authentication-information management unit 5) which are connected to one another via a network, wherein: the service providing unit includes a service providing device (for example, realized by service providing device 21) that provides a specific service via the network, communication devices (for example, realized by communication section 20) that communicate to the terminal unit (7) or the authentication unit (4) by using a specific communication system; a communication-device selection device (for example, realized by communication-device selection device 22) that selects a communication device depending on the terminal unit or authentication unit that is a target for communication, an authentication-unit selection device (for example, realized by authentication-unit selection device 23) that selects an authentication unit to which an authentication of the user of the terminal unit using the service is requested, a session-information management device (for example, realized by session-information management device 24) that manages session information for providing the service to the user based on authentication information showing a successful authentication of the user, and a user-information management device (for example, realized by user-information management device 25) that manages user information for providing the service to the user; the terminal unit includes: communication devices (for example, realized by communication section 30) that communicate to the service providing unit or the authentication unit by using a specific communication system; a communication-device selection device (for example, realized by communication-device selection device 31) that selects a communication device for communication depending on the service providing unit or the terminal unit; an authentication processing device (for example, realized by authentication processing device 32) that transmits specific verification information in response to an authentication processing request from the authentication unit to verify that the user is what he claims to be; a session-identifier management device (for example, realized by session-identifier management device 33) that manages a session identifier issued by the service providing unit or the authentication unit to identify a session established between the terminal unit and the service providing unit; and a terminal-identifier management device (for example, realized by terminal-identifier management device 34) that manages a terminal identifier issued by the authentication-information management unit to identify the terminal unit; the authentication unit includes a communication device that communicates to the service providing unit, the terminal unit, or the authentication-information management unit; a user-information management device (for example, realized by user-information management device 43) that authenticates the user based on personal information of the user that is a target for management; an authentication-information management device (for example, realized by authentication-information management device 42) that creates authentication information based on a result of authentication of the user by the user-information management device, stores the created authentication information into the authentication-information management unit, and requests retrieval of the authentication information to the authentication-information management unit based on the terminal identifier issued by the authentication-information management unit, to acquire the authentication information; and a session-information management device (for example, realized by session-information management device 44) that issues a session identifier to the terminal unit (7) of the authenticated user and manages the issued session identifier; and the authentication-information management unit includes: a communication device (for example, realized by communication section 51) that communicates to the authentication unit; an authentication-information registration device (for example, realized by authentication-information registration device 52) that enters the authentication information issued by the authentication unit and showing a successful authentication of the user; an authentication-information retrieval device (for example, realized by authentication-information retrieval device 53) that retrieves and acquires the authentication information corresponding to the user based on the terminal identifier; and a terminal-identifier management device (for example, realized by terminal-identifier management device 54) that issues the terminal identifier to the terminal unit used by the user when the authentication-information registration device registers the authentication information.

The present invention is directed to a service providing unit, provided in a distributed authentication system that includes an authentication-information management unit managing authentication information showing a successful authentication of a user of a terminal unit, for providing a specific service to a terminal unit, the service providing unit including: a session-information storage device that stores therein session information showing a session established between the terminal unit and the service providing unit, upon establishing the session between the terminal unit and the service providing unit; a session-information management device that manages the session information stored in the session-information storage device; and a service authorization device that judges whether or not provision of the service to the terminal unit is to be permitted based on the session information managed by the session-information management device when the terminal unit changes a communication device used for establishing the session to another communication device.

The present invention is directed to an authentication-information management unit, provided in a distributed authentication system that performs a distributed authentication of a user, for managing authentication information showing that an authentication unit authenticating the user of a terminal unit succeeded in authentication of the user of the terminal unit, the authentication-information management unit including: an authentication-information storage device that stores therein the authentication information; a retrieval-request receiving device that receives a retrieval request requesting retrieval of the authentication information from the authentication unit via a communication network; and an authentication-information retrieval device that retrieves the authentication information stored in the authentication-information storage device if the retrieval-request receiving device receives the retrieval request.

The present invention is directed to a distribution authentication method for performing a distributed authentication of a user, including the steps of: managing, in an authentication-information management unit, authentication information that shows a successful authentication of the user of a terminal unit; transmitting a service request that requests provision of a service from the terminal unit to a service providing unit via a communication network while using one of a plurality of communication devices; creating and storing, in the service providing unit, session information that shows a session established between the terminal unit and the service providing unit, upon establishing the session between the terminal unit and the service providing unit; managing, in the service providing unit, the created session information; and judging, in service providing unit, whether or not provision of the service to the terminal unit is to be permitted based on the managed session information when the terminal unit changes a communication device used for establishing the session to a different communication device.

The present invention is directed to a distribution authentication method for performing a distributed authentication of a user in a distributed authentication system that includes a service providing unit, a terminal unit, an authentication unit, and an authentication-information management unit which are connected to one another via a network, the method including the steps of: providing a specific service via the network from the service providing unit; communicating, in the service providing unit, to the terminal unit or the authentication unit while using a specific communication system; selecting, in the service providing unit, a communication device depending on the terminal unit or authentication unit that is a target for communication; selecting, in the service providing unit, an authentication unit to which authentication of the user of the terminal unit using the service is to be requested; managing, in the service providing unit, session information for providing the service to the user based on authentication information showing a successful authentication of the user; managing, in the service providing unit, user information to be used for providing the service to the user; communicating between the terminal unit and the service providing unit or the authentication unit by using a specific communication system; selecting, in the terminal unit, a communication device depending on the service providing unit or terminal unit that is a target for communication; transmitting, from the terminal unit, specific verification information in response to an authentication processing request from the authentication unit, to verify the user is what he claims to be; managing, in the terminal unit, a session identifier issued by the service providing unit or the authentication unit to identify a session established between the terminal unit and the service providing unit; managing, in the terminal unit, a terminal identifier issued by the authentication-information management unit to identify the terminal unit; communicating between the authentication unit and the service providing unit, the terminal unit or the authentication-information management unit; authenticating, in the authentication unit, the user based on personal information of the user that is a target for management; creating, in the authentication unit, authentication information based on a result of authentication of the user, entering the created authentication information into the authentication-information management unit, and requesting retrieval to the authentication-information management unit based on the terminal identifier issued by the authentication-information management unit, to thereby acquire the authentication information; issuing, in the authentication unit, a session identifier to the terminal unit of the authenticated user, and managing the issued session identifier; communicating between the authentication-information management unit and the authentication unit; registering, in the authentication-information management unit, authentication information issued by the authentication unit to show a successful authentication of the user; retrieving to acquire, in the authentication-information management unit, the authentication information corresponding to the user based on the terminal identifier; and issuing the terminal identifier, in the authentication-information management unit, to the terminal unit used by the user upon registering the authentication information.

The present invention is directed to a program running on a computer configuring a service providing unit in a distributed authentication system that includes an authentication-information management unit managing authentication information showing a successful authentication of a user of the terminal unit, the program defining the processings of: creating and storing session information that shows a session established between the terminal unit and the service providing unit upon establishing the session between the terminal unit and the service providing unit; managing the session information stored; and judging whether or not provision of the service to the terminal unit is to be permitted based on the managed session information when the terminal unit changes a communication device used for establishing the session to another communication device.

The present invention is directed to a program running on a computer configuring a service providing unit, provided in a distributed authentication system that includes an authentication-information management unit managing authentication information that shows a successful authentication of a user of the terminal unit, for providing a specific service to a terminal unit, the program defining: a service providing processing that provides a specific service via a network; a communicating processing that communicates, while using a specific communication system, to the terminal unit or an authentication unit that authenticates the user of the terminal unit; communication-device selecting processing that selects a communication device depending on the terminal unit or authentication unit that is a target for communication; an authentication-unit selecting processing that selects an authentication unit to which authentication of the user of the terminal unit using the service is to be requested; a session-information managing processing that manages session information for providing the service to the user based on the authentication information showing a successful authentication of the user; and a user-information managing processing that manages user information used for providing the service to the user.

The present invention is directed to a program running on a computer configuring a service providing unit, the program defining:
a terminal-environment-information analyzing processing that analyzes terminal-environment information showing preference of the user using the terminal unit or environment where the terminal unit is located; a communication-device selecting processing that selects a communication device based on a result of analysis of the terminal-environment information; and authentication-unit selecting processing that selects an authentication unit based on a result of analysis of the terminal-environment information.

The present invention is directed to a program running on a computer configuring a terminal unit provided in a distributed authentication system that performs a distributed authentication and includes an authentication-information management unit managing authentication information showing a successful authentication of a user of the terminal unit, the program defining: a communication processing that communicates to a service providing unit for providing a specific service to the terminal unit or an authentication unit for authenticating the user of the terminal unit while using a specific communication system; a communication-device selecting processing that selects a communication device depending on the service providing unit or terminal unit that is a target for communication; an authentication processing that transmits specific verification information in response to an authentication processing request from the authentication unit, to thereby verify that the user is what he claims to be; a session-identifier management processing that manages a session identifier issued by the service providing unit or the authentication unit to identify a session established between the terminal unit and the service providing unit; and a terminal-identifier management processing that manages a terminal identifier issued by the authentication-information management unit to identify the terminal unit.

The present invention is directed to a program running on an authentication unit, provided in a distributed authentication system that performs a distributed authentication and includes an authentication-information management unit, for authenticating a user of a terminal unit, the program defining: a communication processing that communicates to a service providing unit providing a specific service to the terminal unit, the terminal unit, or the authentication-information management unit: a user-information management processing that authenticates the user based on personal information of the user that is a target for management; an authentication-information management processing that creates authentication information based on result of authentication of the user, enters the created authentication information into the authentication-information management unit, requests retrieval of the authentication information to the authentication-information management unit based on a terminal identifier issued by the authentication-information management unit, to acquire the authentication information; a session-information management processing that issues a session identifier to the terminal unit of the authenticated user, and manages the created session identifier.

The present invention is directed to a program running on a computer configuring an authentication-information management unit, provided in a distributed authentication system that performs a distributed authentication, for managing authentication information showing that an authentication unit for authenticating of a user of a terminal unit successfully authenticated the user of the terminal unit, the program defining the processings of: storing the authentication information; receiving a retrieval request requesting retrieval of the authentication information from the authentication unit via a communication network; and retrieving the stored authentication information upon receiving the retrieval request.

The present invention is directed to a program running on a computer configuring an authentication-information management unit, provided in a distributed authentication system that performs a distributed authentication, for managing authentication information showing that an authentication unit for authenticating of a user of a terminal unit successfully authenticated the user of the terminal unit, the program defining: a communication processing that communicates to the authentication unit; an authentication-information registration processing that registers authentication information issued by the authentication unit to show a successful authentication of the user; an authentication-information retrieval processing that retrieves and acquires the authentication information corresponding to the user based on the terminal identifier; and a terminal-identifier management processing that issues the terminal identifier to the terminal unit used by the user upon registration of the authentication information.

The above and other objects, features and advantages of the present invention will be more apparent from the following description, referring to the accompanying drawings.

BRIEF DESCRIPTION OF THE DRAWINGS

FIG. 19 is an explanatory diagram showing an example of the information managed by the authentication-information management unit.

FIG. 20 is an explanatory diagram showing an example of the management information managed by the authentication unit.

FIG. 21 is an explanatory diagram showing an example of the management information managed by the service providing unit.

FIG. 22 is an explanatory diagram showing an example of the management information managed by the terminal unit.

FIG. 24 is an explanatory diagram showing an example of the management information managed by the authentication unit.

FIG. 25 is an explanatory diagram showing an example of table 212 updated upon shift of the session.

FIG. 27 is an explanatory diagram showing a flow of searching IdP by using SAML.

BEST MODES FOR CARRYING OUT THE INVENTION

Exemplary Embodiment 1

Figure 1:
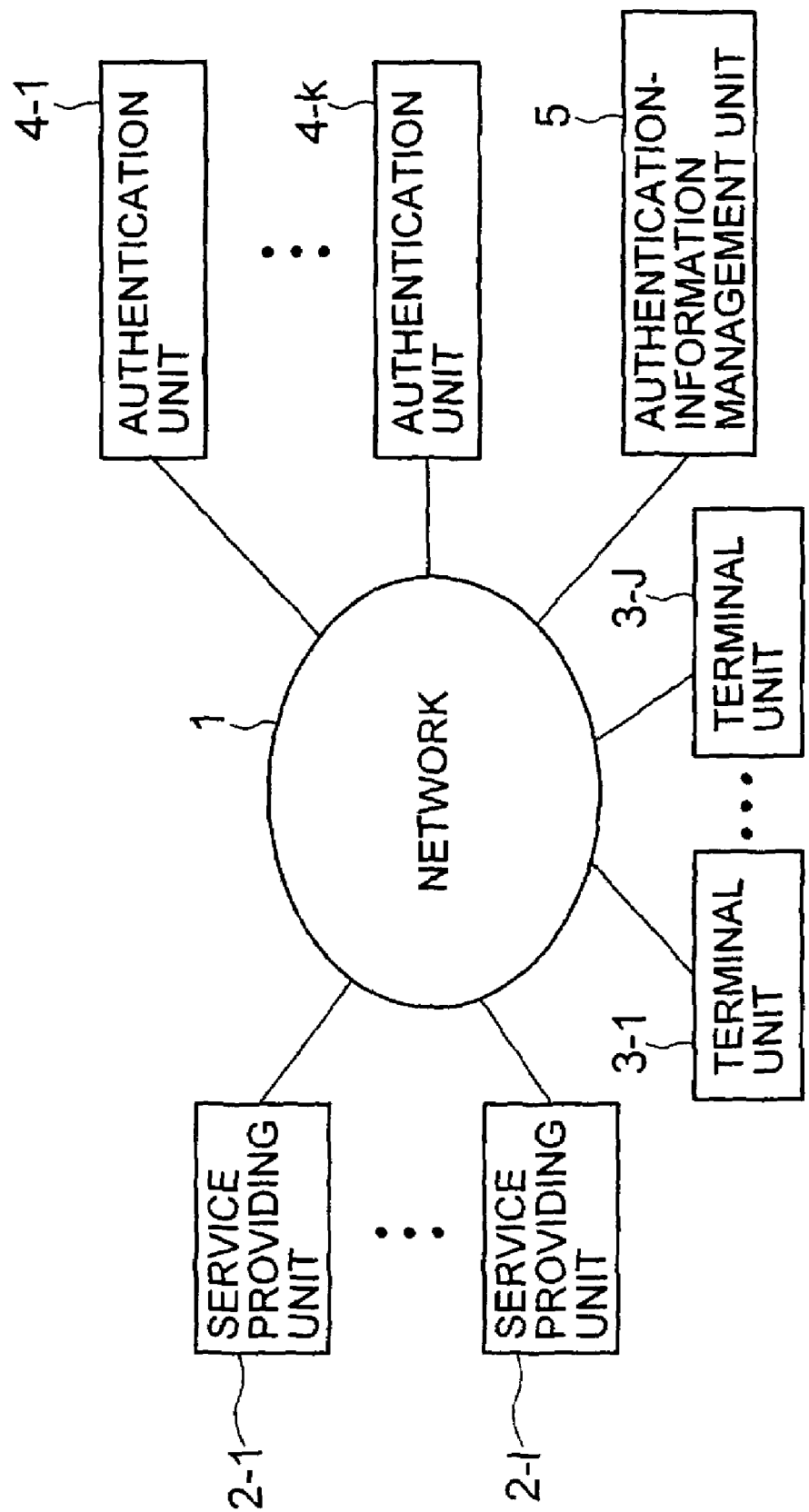
FIG. 1 is a block diagram showing an example of the configuration of the distributed authentication system according to the present invention.

Hereinafter, a first exemplary embodiment of the present invention will be described with reference to the drawings. FIG. 1 is a block diagram showing an example of the configuration of a distributed authentication system according to the present invention. As shown in FIG. 1, the distributed authentication system includes a plurality of service providing units 2-1 to 2-I, a plurality of terminal units 3-1 to 3-J, a plurality of authentication units 4-1 to 4-K, and an authentication-information management unit 5.

In the present exemplary embodiment, when the service providing units 2-1 to 2-I are collectively referred to or an arbitrary one of them is referred to, the units or unit may be referred to simply as service providing unit(s) 2. When the terminal units 3-1 to 3-J are collectively referred to or an arbitrary one of them is referred to, the units or unit may be referred to simply as terminal unit(s) 3. When the authentication unit 4-1 to authentication unit 4-K are collectively referred to or an arbitrary one of them is referred to, the units or unit may be referred to simply as authentication unit(s) 4.

As shown in FIG. 1, the service providing units 2, terminal units 3, authentication units 4, and authentication-information management units 5 are connected to a network 1, such as the Internet. The service providing units 2, terminal units 3, and authentication units 4 communicate each other via the network 1. The authentication units 4 and authentication-information management unit 5 communicate each other via the network 1.

Figure 2:
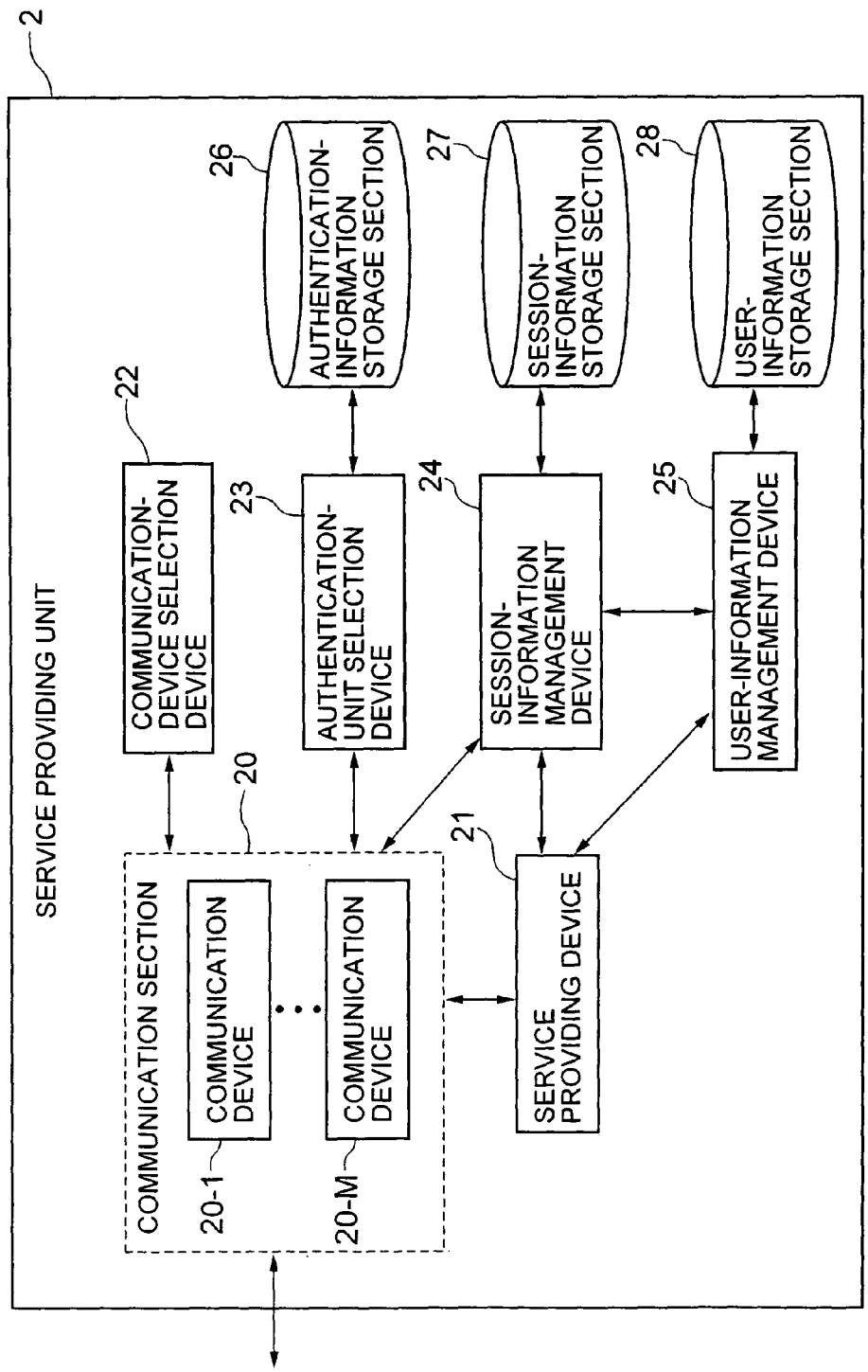
FIG. 2 is block diagram showing an example of the configuration of the service providing unit.

The service providing unit 2 has the configuration shown in FIG. 2, and provides a variety of services (for example, telephone service, e-mail service, information search service, fee accounting service, etc.) to users via the network 1. The terminal unit 3 is a terminal operated by a user to receive a service provided by the service providing unit 2, and has the configuration shown in FIG. 3. The authentication unit 4 has the configuration shown in FIG. 4, and performs authentication of a user by using a specific authentication device, when the service providing unit 2 needs authentication of the user.

The service providing unit 2 is realized in particular by an information processor, such as a workstation or personal computer. The service providing unit 2 is configured, for example, by a server managed by a service provider who provides a variety of services via the network 1. For example, the service providing unit 2 provides a telephone service (for example, IP telephone service) and an e-mail service via the network 1 in response to a request from the terminal unit 3. For example, the service providing unit 2 performs information search in response to a request from the terminal unit 3, and provides an information search service that delivers searched information to the terminal unit 3 via the network 1. Although FIG. 1 shows a case where the distributed authentication system includes a plurality of service providing units 2, the distributed authentication system may also include a single service providing unit 2.

FIG. 2 is a block diagram showing an example of the configuration of the service providing unit. As shown in FIG. 2, the service providing unit 2 includes therein a communication section 20, a service providing device 21, a communication-device selection device 22, an authentication-unit selection device 23, a session-information management device 24, a user-information management device 25, an authentication-unit-information storage section 26, a session-information storage section 27, and a user-information storage section 28.

The communication section 20 is realized, in particular, by a CPU and a network interface section of the information processor operating according to a program. The communications section 20 includes therein a plurality of communication devices 20-1 to 20-M. The communications section 20 may include a single communication device. Each communication device 20-1 to 20-M (M is a natural number equal to or larger than one) is a device for communicating to the terminal unit 3 and authentication unit 4 by using a specific communication procedure. In the present exemplary embodiment, the communication section 20 has a function of performing communication while selecting one of the communication devices 20-1 to 20-M based on the instruction from the communication-device selection device 22. The communication section 20 communicates in particular by selecting either one of a plurality of communication protocols having different transmission speeds and/or different communication principles.

The service providing device 21 is realized, in particular, by the CPU of an information processor that operates according to a program. The service providing device 21 releases services to public, and has a function of providing a variety of services to the terminal unit 3 via the network 1 while using the communication section 20. The service providing device 21 provides, in particular, a variety of services by transmitting/receiving a variety of information to/from the terminal unit 3 via the network 1 while using the communication section 20. In the present exemplary embodiment, the service providing device 21 provides a service to a user that posses the terminal unit 3 having a session identifier provided by the session-information management device 24, and that is managed by the user-information management device 25 and suitably authorized to receive the service.

The communication-device selection device 22 is realized, in particular, by the CPU of an information processor that operates according to a program. The communication-device selection device 22 has a function of selecting, based on the service provided by the service providing device 21, a communication device to be used for communication with the terminal unit 3. The communication-device selection device 22 has a function of selecting a specific communication device for communication with the authentication unit 4. The communication-device selection device 22 selects, in particular, either one of the plurality of communication protocols having different transmission speeds and/or different communication principles based on the service to be provided.

The authentication-unit selection device 23 is realized, in particular, by the CPU of an information processor that operates according to a program. The authentication-unit selection device 23 has a function of selecting an authentication unit that is suitably used to authenticate the user from the list of tabulated authentication units stored in the authentication-unit-information storage section 26. The authentication-unit selection device 23 manages the authentication-unit-information storage section 26, and has a function of retrieving and updating information of the authentication units stored in the authentication-unit-information storage section 26.

The authentication-unit-information storage section 26 is realized, in particular, by a storage unit, such as magnetic disk unit or optical disk unit. The authentication-unit-information storage section 26 stores therein list information that correlates together the authentication units (for example, address of the authentication units 4 of the authentication agent with which the service provider concludes a contract beforehand) with which the service providing unit 2 is capable of cooperation, access destinations of the authentication information authorized by the authentication agents, and communication devices 20-1 to 20-M which are used for communication to the authentication units.

The session-information management device 24 is realized, in particular, by the CPU of an information processor that operates according to a program. The session-information management device 24 has a function of managing the session information based on which a user receives the service provided by the service providing device 21. In the present exemplary embodiment, the session-information management device 24 manages the session information stored in the session-information storage section 27. The session-information management device 24 manages the session information by retrieving and updating the session information stored in the session-information storage section 27.

The session information shows a session established between the terminal unit 3 and the service providing unit 2. The session information includes a session identifier provided to the terminal unit 3 of the user, and authentication information of the user issued by the authentication unit 4. The session identifier identifies the session established between the terminal unit 3 and the service providing unit 2. The authentication information shows that the authentication unit 4 succeeded in authentication of the user.

The session-information management device 24 has a function of managing a management table that correlates together the session identifier, the user identifier managed by the user-information management device 25, and an identifier identifying the authentication information of the user issued by the authentication unit 4. For example, the management table is stored in the session-information storage section 27. The session-information management device 24 can retrieve and acquire (extract) associated information from the management table by using either of the identifier information as a key, and can update the information included in the management table.

The session-information management device 24 has also a function of creating the session identifier. In the present exemplary embodiment, the session-information management device 24 creates, upon establishing a session with the terminal unit 3, the session identifier. The session-information management device 24 has a function of judging whether or not provision of the service to the terminal unit 3 is authorized, based on the session information managed therein.

In the present exemplary embodiment, the session-information management device 24 in the service providing unit 2 creates a session identifier, and the session-information management device 44 in the authentication unit 4 also creates another session information. The session identifier created by the service providing unit 2 may be hereinafter referred to as service-providing-side session identifier, whereas the session identifier created by the authentication unit 4 may be referred to as authentication-side session identifier. The service-providing-side session identifier and authentication-side session identifier are managed in the service providing unit 2 and authentication unit 4, respectively, independently of each other.

The session-information storage section 27 is realized, in particular, by a storage unit, such as a magnetic disk unit or optical disk unit. The session-information storage section 27 stores therein the session information including the session identifier and authentication information.

The user-information management device 25 is realized, in particular, by the CPU of an information processor that operates according to a program. The user-information management device 25 has a function of managing the user identifier information, and the security policy and access management policy that controls the action when a user uses the service providing device 21, while using the user-information storage section 28. In the present exemplary embodiment, the user-information management device 25 manages the user identifier information, security policy and access control policy stored in the user-information storage section 28. The user-information management device 25 manages, in particular, the user identifier information, security policy and access control policy by retrieving and updating the user identifier information, security policy and access control policy stored in the user-information storage section 28.

The user-information management device 25 has a function of providing (outputting), to the service providing device 21, information of authorization of access to the service by the user.

The "user identifier information" is an identifier that identifies the user of the terminal unit 3. The "authorization information" is information that shows provision of service is authorized to the user of the terminal unit 3.

The user-information storage section 28 is realized, in particular, by a storage unit, such as magnetic disk unit or optical disk unit. The user-information storage section 28 stores therein the user identifier information, security policy and access control policy.

The terminal unit 3 is a device used by a user, and in particular, is realized by an information processing terminal such as personal computer or portable phone. Although the distributed authentication system in FIG. 1 includes a plurality of terminal units 3, the distributed authentication system may include a single terminal unit 3.

Figure 3:
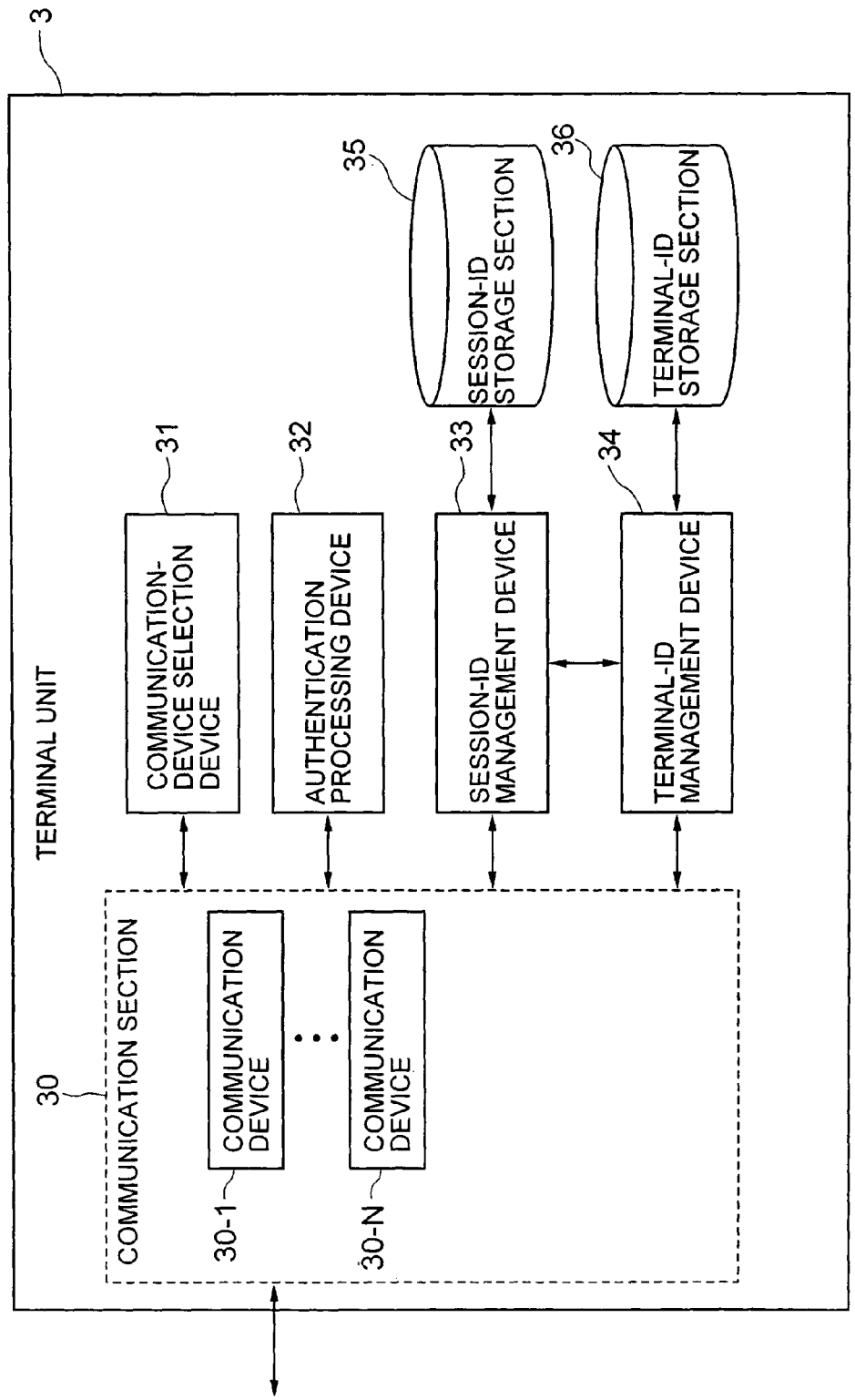
FIG. 3 is a block diagram showing an example of the configuration of the terminal unit.

FIG. 3 is a block diagram showing an example of the configuration of the terminal unit. As shown in FIG. 3, the terminal unit 3 includes a communication section 30, a communication-device selection device 31, an authentication processing device 32, a session-identifier management device 33, a terminal-identifier management device 34, a session-identifier storage section 35, and a terminal-identifier storage section 36.

The communication section 30 is realized, in particular, by the CPU of the information processing terminal that operates according to a program and a network interface section. The communication section 30 includes a plurality of communication devices 30-1 to 30-N. The communication section 30 may include a single communication device. Each communication device 30-1 to 30-N (N is a natural number equal to or larger than one) is a device for communicating to the service providing unit 2 and authentication unit 4 by using a specific communication principle. In the present exemplary embodiment, the communication section 30 includes a function of selecting one of communication devices 30-1 to 30-N for communication based on the instruction by the communication-device selection device 31. The communication section 30 communicates, in particular, by selecting one of a plurality of communication protocols having different transmission speeds and/or different communication principles.

The communication section 30 has a function of inserting, into the message for transmission, the session identifier managed by the session-identifier management device 33, and the terminal identifier managed by the terminal-identifier management device 34 according to the communication device 30-1 to 30-N and the destination device for the communication. The "terminal identifier" is an identifier that identifies the terminal unit 3.

The communication-device selection device 31 is realized, in particular, by the CPU of the information processing terminal that operates according to a program. The communication-device selection device 31 has a function of selecting a communication device in accordance with the service provided by the service providing unit 2 and/or the authentication principle imposed by the authentication unit 4.

The authentication processing device 32 is realized, in particular, by the CPU of the information processing terminal that operates according to a program. The authentication processing device 32 is a device for transmitting credential information required for authentication of the user, the credential information matching with the authentication scheme imposed by the authentication unit 4. The authentication processing device 32 transmits, in particular, the credential information to the authentication unit 4 via the network 1 while using the communication section 30.

The "credential information" is information that verifies the user of the terminal unit 3. A variety of information such as information input by the user or stored in the terminal unit 3 may be used as the credential information depending on the authentication scheme. For example, the authentication processing device 32 transmits a user ID and a password as the credential information.

The session-identifier management device 33 is realized, in particular, by the CPU of the information processing terminal that operates according to a program. The session-identifier management device 33 has a function of managing the session identifier issued to the service providing unit 2 by using the session-identifier storage section 35, and session identifier issued to the terminal unit 3 from the authentication unit 4. In the present exemplary embodiment, the session-identifier management device 33 manages the session identifier stored in the session-identifier storage section 35. The session-identifier management device 33 manages the session identifier by retrieving and updating the session identifier stored in the session-identifier storage section 35.

The session-identifier storage section 35 is realized, in particular, by a storage unit, such as magnetic disk unit or optical disk unit. The session-identifier storage section 35 stores therein the session identifier issued to the service providing unit 2 and the session identifier issued to the terminal unit 3. In the present exemplary embodiment, the session-identifier storage section 35 stores therein the session identifier in association with the terminal identifier.

The terminal-identifier management device 34 is realized, in particular, by the CPU of the information processing terminal that operates according to a program. The terminal-identifier management device 34 has a function of managing the terminal identifier to be supplied to the terminal unit 3 while using the terminal-identifier storage section 36. The terminal identifier is correlated with the authentication-unit information corresponding to the session that is established after completing authentication of the user using the terminal unit 3. The "authentication-unit information" is information (for example, ID of the authentication 4) that shows the authentication unit 4 which authenticated the terminal unit 3.

The terminal-identifier management device 34 manages the terminal identifier by acquiring (extracting) the registered terminal identifier from the terminal-identifier storage section 36, or updating the terminal identifier stored in the terminal-identifier storage section 36, based on the authentication-unit information.

The terminal identifier may be provided beforehand to the terminal unit 3 by the terminal-identifier management device 54 in the authentication-information management unit 5, for example. In this case, the terminal-identifier management device 54 issues a terminal identifier to each terminal unit 3 beforehand. The terminal-identifier management device 54 transmits the terminal identifier to the each terminal unit 3 via the network 1 while using the communication section 51. The terminal-identifier management device 34 of the each terminal unit 3 stores the received terminal identifier in the terminal-identifier storage section 36.

For example, the terminal identifier may be issued by the terminal-identifier management device 54 when the authentication information of the user is entered into the authentication-information management unit 5. In this case, the terminal-identifier management device 54, upon registering the authentication information, issues the terminal identifier to the terminal unit 3 corresponding to the authentication information that is the target for registration. The terminal-identifier management device 54 transmits the terminal identifier to the terminal unit 3 via the network 1 while using the communication section 51. The terminal-identifier management device 34 in the terminal unit 3 stores the received terminal identifier in the terminal-identifier storage section 36.

The terminal-identifier storage section 36 is realized, in particular, by a storage unit, such as magnetic disk unit or optical disk unit. The terminal identifier storage section 36 stores the terminal identifier in association with the authentication-unit information.

The authentication unit 4 is realized, in particular, by an information processor, such as workstation or personal computer. The authentication unit 4 is, for example, a server managed by an authentication agent that authenticates the user of the terminal unit 3. Although FIG. 1 shows a case where the distributed authentication system includes a plurality of authentication units 4, the distributed authentication system may include a single authentication unit 4.

Figure 4:
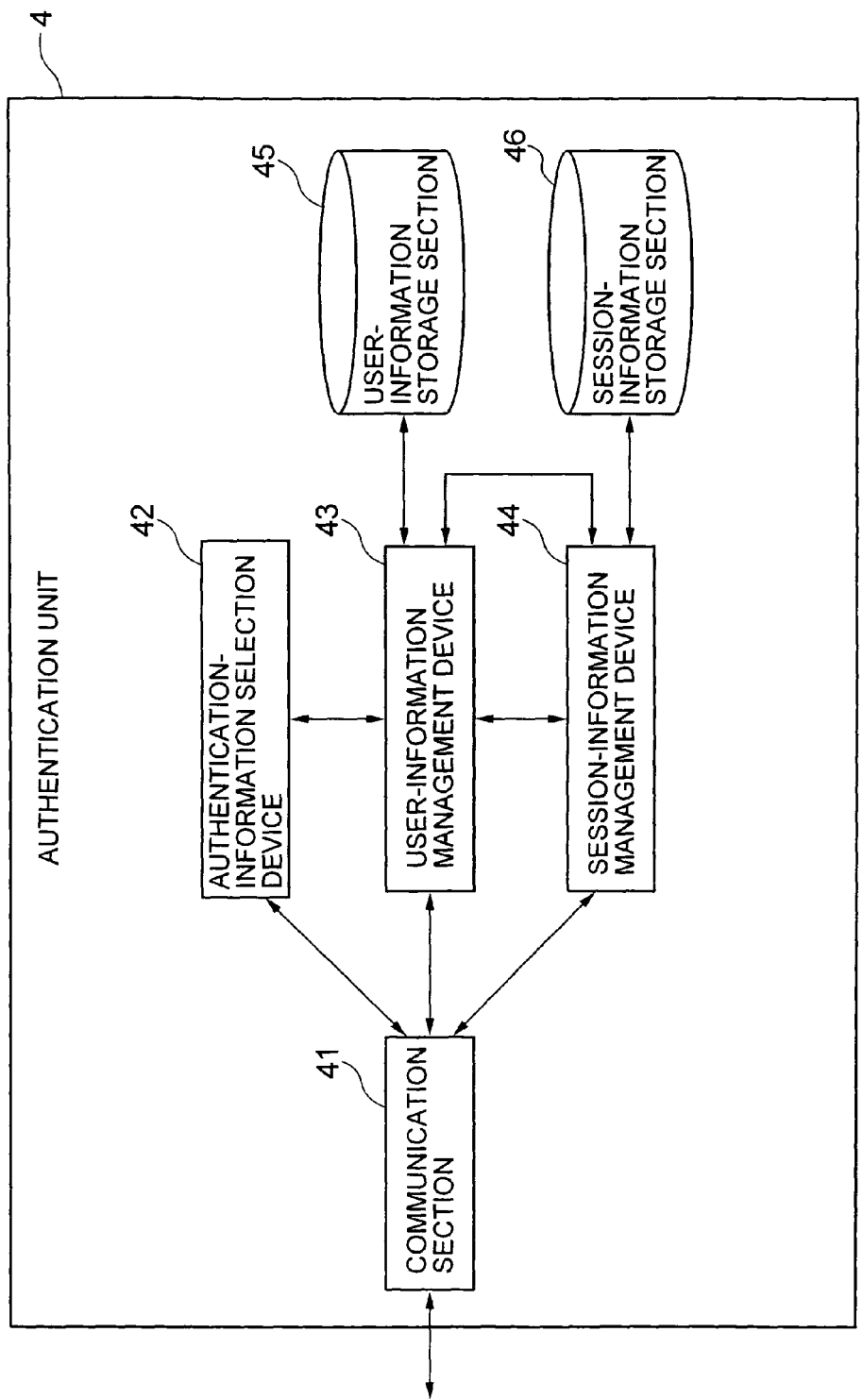
FIG. 4 is a block diagram showing an example of the configuration of the authentication unit.

FIG. 4 is a block diagram showing an example of the configuration of the authentication unit. As shown in FIG. 4, the authentication unit 4 includes a communication section 41, an authentication-information management device 42, a user-information management device 43, a session-information management device 44, a user-information storage section 45, and a session-information storage section 46.

The communication section 41 is realized, in particular, by a CPU and a network interface section of information processor that operates according to a program. The communication section 41 includes a specific communication device that communicates to the service providing unit 2, terminal unit 3 and authentication-information management unit 5. The communication section 41 communicates, in particular, with the service providing unit 2, terminal unit 3, and authentication-information management unit 5 according to a specific communication protocol.

The authentication-information management device 42 is realized, in particular, by the CPU of an information processor that operates according to a program. The authentication-information management device 42 is a device for managing the authentication information of the user authenticated by the user-information management device 43. In particular, the authentication-information management device 42 transmits the authentication information of the authenticated user to the authentication-information management unit 5 while using the communication section 41 via the network 1, and enters the same into the authentication-information management unit 5. The authentication-information management device 42 acquires (receives) the authentication information of the user stored in the authentication-information management unit 5 from the authentication-information management unit 5 via the network 1.

The user-information management device 43 is realized, in particular, by the CPU of an information processor that operates according to a program. The user-information management device 43 is a device for managing the personal information of the user (for example, address information). The user-information management device 43 has a function of authenticating the user by using a suitable authentication scheme. The user-information management device 43 has a function of entering the personal information of the user into the user-information storage section 45, and acquiring (extracting) the personal information of the user registered in the user-information storage section 45.

The user-information management device 43 includes a specific authentication device and has a function of authenticating the user by comparison using the credential information of the user (hereinafter, may be referred to as registered credential information) stored beforehand in the user-information storage section 45. In the present exemplary embodiment, the user-information management device 43 receives the credential information (for example, user ID and password) via the network 1 while using the communication section 41. The user-information management device 43 judges, upon judging that the received credential information matches with the credential information stored in the user-information storage section 45, that authentication of the user is succeeded.

The user-information storage section 45 is realized, in particular, by a storage unit, such as magnetic disk unit or optical disk unit. The user-information storage section 45 stores therein personal information of the user of each terminal unit 3 beforehand. In addition, the user-information storage section 45 stores therein the registered credential information beforehand for authenticating the user of each terminal unit 3.

The session-information management device 44 is realized, in particular, by the CPU of an information processor that operates according to a program. The session-information management device 44 has a function of issuing the session identifier (authentication-side session identifier) to the terminal unit 3 used by the user that is authenticated by the user-information management device 43. The session-information management device 44 has also a function of entering the issued session identifier into the session-information storage section 46 for management thereof.

The session-information management device 44 has also a function of managing the terminal identifier information (terminal identifier for identifying the terminal unit 3 used by the user) provided from the authentication-information management unit 5 while using the session-information storage section 46. The session-information management device 44 records the session identifier that identifies the session established on the user terminal unit 3 in the session-terminal-information storage section 46, in association with the terminal identifier information corresponding to the terminal unit 3, for management thereof. The session-information management device 44 retrieves and updates the session identifier and terminal identifier stored in the session-information storage section 46, to manage the session identifier and terminal identifier.

The session-information storage section 46 is realized, in particular, by a storage unit, such as magnetic disk unit or optical disk unit. The session-information storage section 46 stores therein the session identifier and terminal identifier in association with each other.

Figure 5:
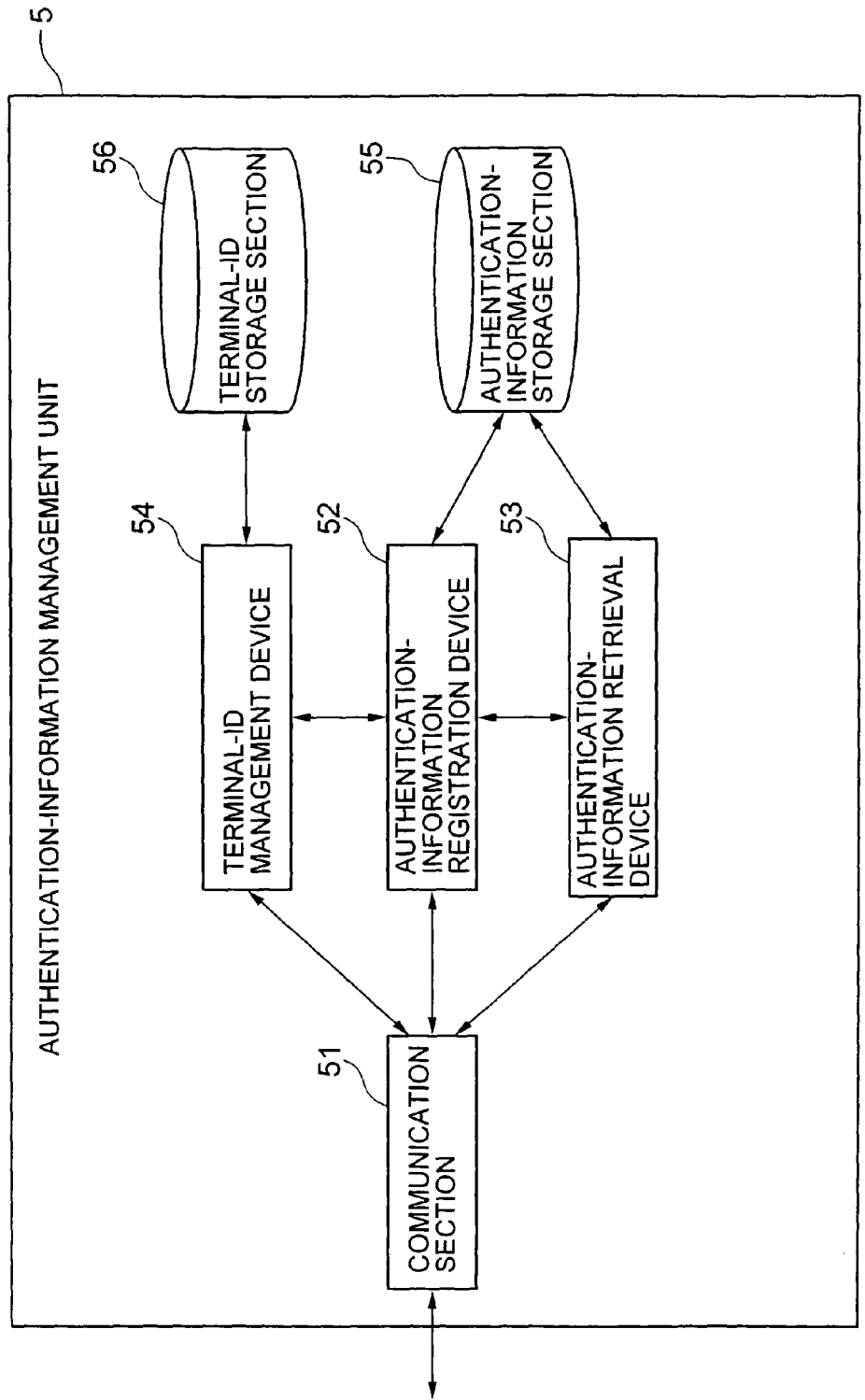
FIG. 5 is a block diagram showing an example of the configuration of the authentication-information management unit.

The authentication-information management unit 5 is realized, in particular, by an information processor, such as workstation or personal computer. FIG. 5 is a block diagram showing an example of the configuration of the authentication-information management unit. The authentication information management unit 5 is a device that manages authentication information of users authenticated by the authentication units 4. More specifically, the authentication information of the users that are authenticated by the authentication units 4 is shared in the distributed authentication system by using the authentication-information management unit 5. It is to be noted that "management of the authentication information" means newly storing the authentication information in the authentication-information storage section 55, or retrieving the authentication information stored in the authentication-information storage section 55 in response to a request from the authentication unit 4.

As shown in FIG. 5, the authentication-information management unit 5 includes a communication section 51, an authentication-information registration device 52, an authentication-information retrieval device 53, a terminal-identifier management device 54, an authentication-information storage section 55, and a terminal-identifier storage section 56.

The communication section 51 is realized, in particular, by the CPU of the information processor that operates according to a program and a network interface section. The communication section 51 is a device that communicates to the authentication unit 4. More specifically, the communication section 51 communicates to the authentication unit 4 according to a specific communication protocol.

The authentication-information registration device 52 is realized, in particular, by the CPU of an information processor that operates according to a program. The authentication-information registration device 52 has a function of receiving a registry request of the authentication information (namely, registry request of the authentication information of a user authenticated by the authentication unit 4) transmitted from the authentication unit 4 via the network 1 while using the communication section 51. The authentication-information registration device 52 has a function of recording, upon receiving the registry request, the authentication information of the user in the authentication-information storage section 55 by using, as a key, the terminal identifier issued by the terminal-identifier management device 54.

The authentication-information storage section 55 is realized, in particular, by a storage unit, such as magnetic disk unit or optical disk unit. The authentication-information storage section 55 stores therein the authentication information showing the fact that the authentication unit 4 authenticated the user of the terminal unit 3, in association with the authentication identification information.

The authentication-information retrieval device 53 is realized, in particular, by the CPU of an information processor that operates according to a program. The authentication-information retrieval device 53 has a function of receiving a retrieval request of the authentication information (for example, authentication information retrieval request including a terminal identifier) transmitted from the authentication unit 4 via the network 1 while using the communication section 51. The authentication-information retrieval device 53 has a function of retrieving to acquire (extract) the authentication information of the user stored in the authentication-information storage section 56 by using, as a key, the terminal identifier included in the authentication information which quested the retrieval. The authentication-information retrieval device 53 has a function of replying (transmitting) the extracted authentication information to the authentication unit 4 via the network 1 while using the communication section 51.

The terminal-identifier management device 54 is realized, in particular, by the CPU of an information processor that operates according to a program. The terminal-identifier management device 54 has a function of managing the terminal identifier information for identifying the terminal unit 3 used by the user while using the terminal-identifier storage section 56. The terminal-identifier management device 54 has a function of issuing a new terminal identifier to the terminal unit 3 if needed, upon registry of the authentication information of the user. The terminal-identifier management device 54 has a function of allowing the terminal-identifier storage section 56 to store therein the issued terminal identifier.

In the present exemplary embodiment, the terminal-identifier management device 54 allows the authentication-information storage section 56 to store the terminal identifier in association with the authentication information of the user stored in the terminal-identifier storage section 56. The terminal-identifier management device 54 performs acquisition (extraction) and registration of the authentication information by using the terminal identifier as a key.

The terminal-identifier storage section 56 is realized, in particular, by a storage unit, such as magnetic disk unit or optical disk unit. The terminal identifier storage section 56 stores therein the terminal identifier.

Each communication section/communication device in the service providing unit 2, terminal unit 3, authentication unit 4 and authentication-information management unit 5, which are described above, has a mechanism of preventing eavesdropping of the transmitted/received message by a third party during communication with another. Each communication section/communication device performs communication on the SSL (secure sockets layer), TLS (transport layer security), etc., or according to the protocol equivalent to the SSL or TLS, to prevent eavesdropping of the message.

Each communication section/communication device has an encryption function that allows notification (transmission) of the contents of the message transmitted and received by another to be limited to the specified communication party, and not to be exposed to another communication party having such an intention. Each communication section/communication device has a decoding function of decoding upon receiving the encrypted information. Each communication section/communication device has a signature function for certifying that the contents of the message transmitted and received by another are created by a suitable device and have not been altered. Each communication section/communication device has a verification function to verify the contents of the signature.

Figure 6:
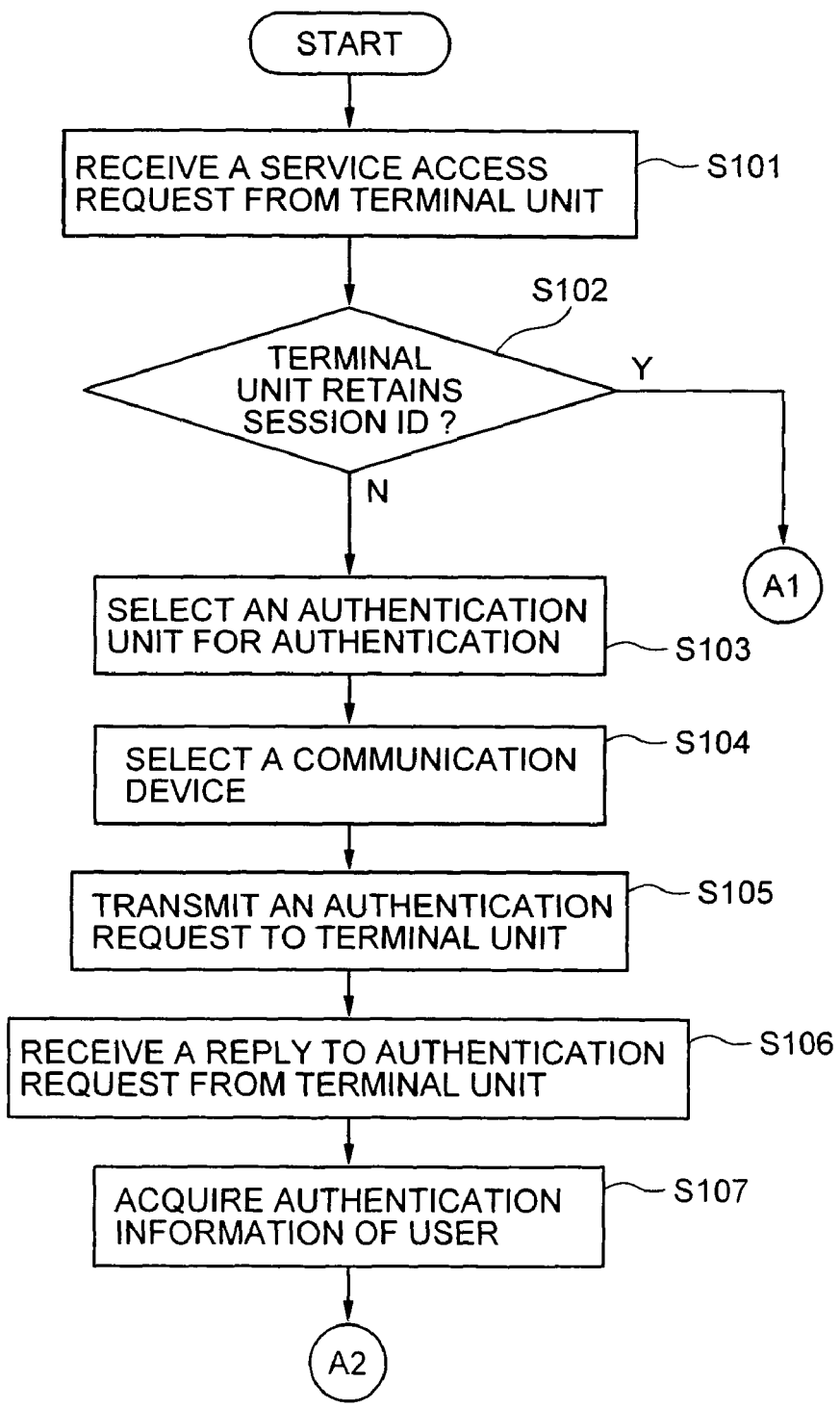
FIG. 6 is a flowchart showing an example of the procedure performed by the service providing unit.
Figure 7:
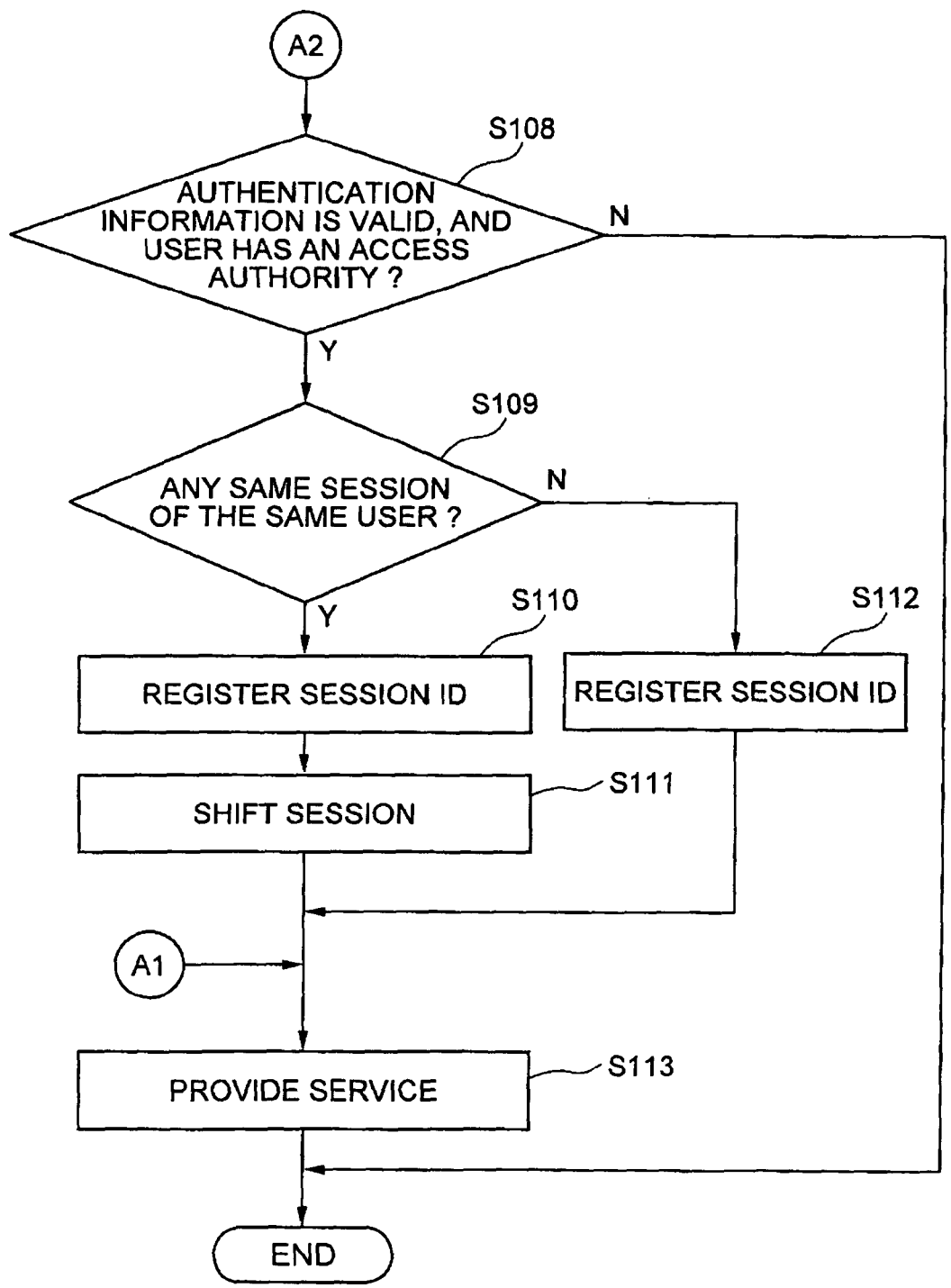
FIG. 7 is a flowchart showing an example of the procedure performed by the service providing unit.

Operation will be described hereinafter. First, operation of the service providing unit 2 will be described. FIGS. 6 and 7 are flowcharts each showing an example of the procedure performed by the service providing unit. It is assumed in the present exemplary embodiment that the service providing device 21 of the service providing unit 2 releases a specific service to public, and stays in a state capable of receiving an access from the terminal unit 3 of a user.

The service providing unit 2 receives a request of access to the service from a terminal unit 3 while using a suitable communication device 20-$m1$ ($1 \leq m1 \leq M$) among the plurality of communication devices of the communication section 20 (step S101). More specifically, the service providing unit 2 receives the access request via the network 1 from the terminal unit 3, in particular, according to a communication protocol same as the communication protocol used by the terminal unit 3. If the session is already established between the terminal unit 3 and the service providing unit 2, the service providing unit 2 receives the access request including the session identifier from the terminal unit 3.

The session-information management device 24 investigates (judges) whether or not the access request message received from the terminal unit includes a session identifier showing the fact that the terminal unit 3 has already established a session with the service providing unit 2 (step S102). If it is judged that the access request message includes therein a session identifier (a session identifier is included in the access request), the service providing unit 2 shifts to step S113 (refer to FIG. 7).

On the other hand, if it is judged that the access request message includes no session identifier (a session identifier is not included the access request), the authentication-unit selection device 23 selects an authentication unit 4 that is associated with the service providing unit 2 and capable of providing a suitable authentication device for the terminal unit 3, for requesting the authentication processing of the user (step S103). The "authentication unit 4 with which the service providing unit 2 is in association" means an authentication unit 4 managed by an authentication agent with whom the service provider managing the service providing unit 2 concludes a contract beforehand, for example. The authentication-unit selection device 23 acquires (extracts) the address of the authentication unit 4 on the network and information of the communication device needed for authentication from the authentication-unit-information storage section 26.

For example, the service providing unit 2 determines beforehand the security policy that defines selection criteria and indexes of the authentication unit 4, and stores the same in the authentication-unit-information storage section 26. In this case, the service providing unit 2 stores the security policy including a security level and an authentication intensity (either authentication technique using ID/password, using an ID card and biometrics, or a combination of both) for any of the authentication units 4, for example. The service providing unit 2 stores the security situation of the communication path between the same and the authentication units 4, reliability of the authentication units 4 (social evaluation and past performance thereof), and preference of users to the authentication, for example. The authentication-unit selection device 23 selects a suitable authentication device according to the selection criteria and indexes defined in the security policy.

The service provider and the authentication agent are, in particular, associated with each other beforehand, and the service providing unit 2 and authentication unit 4 cooperate with each other. The service providing unit 2 acquires (receives) information as to the authentication device installed in the authentication unit 4, intensity of the authentication device, authentication technique, and access destination (URL) to the authentication unit 4, from the authentication unit 4, to retain (store) the same in the authentication-unit-information storage section 26. The service providing unit 2 selects an authentication device based on the property and security policy of the service that is the target for provision and, for example, selects an authentication device capable of executing a plurality of authentications such as an authentication using an IC card, in the case of a service requiring a higher authentication strength.

Subsequently, the communication-device selection device 22 selects a communication device used to request the authentication based on the information showing the authentication unit 4 selected at step S103. In this case, the communication-device selection device 22 selects a suitable communication device 20-$m2$ ($1 \leq 2 \leq M$) from among the plurality of communication devices included in the communication section 20 (step S104). In this case, for example, the communication-device selection device 22 selects a communication device matched with the communication protocol (for example, transmission speed and communication system used by the selected authentication unit 4) shown in the authentication-unit information.

The communication device 20-$m2$ creates a message representing a request of authentication (may be referred to as authentication request message hereinafter) to the authentication unit 4 selected by the authentication selection device 23 at step S103, based on the address information of the authentication unit 4 on the network. The communication device 20-$m2$ then transmits the created authentication request message to the terminal unit 3 via the network 1 (step S105).

The authentication request message is a message for the service providing unit 2 to request transmission of the authentication information of the user to the authentication unit 4 via the terminal unit 3. The authentication request message includes the address information of the authentication unit 4 on the network, and is used to instruct the terminal unit 3 to redirect (transmit) the same to the authentication unit 4. More specifically, the terminal unit 3 which received the authentication request message transmits the thus received authentication request message to the authentication unit 4 as it is via the network 1. The authentication unit 4 then authenticates the user of the terminal unit 3 based on the authentication request message transferred from the terminal unit 3.

Subsequently, the communication device 20-$m2$ receives a reply message to the authentication request message from the terminal unit 3 via the network 1 (step S106). The reply message is transmitted from the authentication unit 4 to the terminal unit 3, and is redirected (transferred) by the terminal unit 3 to the service providing unit 2. More specifically, the authentication unit 4 transmits, upon authenticating the user, the reply message that shows the result of authentication processing to the terminal unit 3 via the network 1. The terminal unit 3 transfers the thus received reply message to the service providing unit 2 as it is via the network 1.

After the reply message is received, the session-information management device 24 acquires the authentication information of the user based on the thus received reply message (step S107).

The acquisition method of the authentication information by which the service providing unit 2 acquires the authentication information is different depending on the protocol and profile that realize the single-sign-on. In the present exemplary embodiment, the protocol and profile that realize the single-sign-on are not limited to specific protocol and specific profile, respectively. For example, if the post profile of the WebSSO protocol of SAML is used, the reply message received at step S106 includes an XML document of the authentication information of the user that is referred to as authentication assertion. In this case, the session-information management device 24 can acquire the authentication information by extracting the authentication assertion included in the reply message.

On the other hand, the artifact profile in the WebSSO protocol of SAML can also be used. In this case, the session-information management device 24 acquires (extracts) a ticket associated with the authentication assertion referred to as artifact at step S107 from the artifact profile. The service providing unit 2 then acquires (receives from the authentication unit 4) the authentication assertion by requesting transmission of the authentication assertion to the authentication unit 4 based on the extracted artifact (refer to Non-Patent Document).

As shown above, although the procedure of message exchange is different depending on the protocol and profile, the service providing unit 2 can eventually acquire the authentication information of the user issued by the authentication unit 4. The session-information management device 24 then stores the acquired authentication information in the session-information storage section 27 for management.

The session-information management device 24 analyzes the authentication information of the user, and assures (judges) whether or not the acquired authentication information is one issued by the authentication unit 4 and whether or not it is a valid document which is not subjected to alteration.

Generally, in the communication through the network 1, such as the Internet, a large number of intermediate carriers intervene on the communication path, and the contents of communication may be monitored. If the contents of communication are monitored, there is a possibility that the information that is the target for communication may be altered, and transmitted as if it is the original document. For this reason, the authentication unit 4 adds an electronic signature, for example, to the created authentication information. The session-information management device 24 verifies the electronic signature included in the acquired authentication information, to thereby judge whether or not the authentication information is the valid document which is not subjected to alteration.

The session-information management device 24 also judges whether or not the user corresponding to the user information described in the authentication information has an access authority by requesting assurance of the access authority of the user to the user-information management device 25. In this case, the session-information management device 24 assures that the user information of the corresponding user is recorded in the user-information storage section 28, and that the user has a suitable authority for receiving the service provided by the service providing device 21 (step S108).

The user-information storage section 28 stores therein the user identifier in association with the access restriction policy, for example. In this case, the session-information management device 24 judges whether or not the user identifier of the corresponding user is stored in the user-information storage section 28. The session-information management device 24 also judges whether or not the user has an access authority based on the access restriction policy corresponding to the user identifier.

If it is judged at step S108 that the authentication information not the valid document, or if it is judged that the user does not have a suitable authority, the service providing unit 2 ends the procedure without any processing. More specifically, the service providing device 21 does not provide the service to the user, and refuses the service access request received at step S101.

On the other hand, if it is judged at step S108 that the authentication information is the valid document and that the user has a suitable authority in provision of the service, the session-information management device 24 performs the processings following to step S109, and performs the management procedure for the session identifier of the terminal unit 3 and the authentication information of the user.

The session-information management device 24 searches the session information stored in the session-information storage section 27, to investigate (judge) whether or not there exists session information associated with the authentication information of the user (step S109).

If it is judged that there exists no session information in the session-information storage section 27 (session information corresponding to the authentication information is not stored), the session-information management device 24 creates a new session identifier (service-providing-side session identifier) that identifies the session to be established for the terminal unit 3 to provide the service that is the target for provision based on the authentication information of the user. The session-information management device 24 then enters the newly created session identifier into the session-information storage section 27 (step S112), and shifts to step S113.

On the other hand, if it is judged at step S109 that there exists session information of the user (session information corresponding to the authentication information is stored), the session-information management device 24 creates a new session identifier (service-providing-side session identifier) that identifies the session to be established for the terminal unit 3 in order to provide the service that is the target for provision based on the authentication information of the user. The session-information management device 24 enters the newly created session identifier into the session-information storage section 27 (step S110), and deletes the existing session identifier information (that is already stored in the session-information storage section 27).

The session-information management device 24 realizes a shift of the session by establishing a session with the terminal unit 3 by using the newly created session identifier (step S111). More specifically, the session-information management device 24 judges that provision of the service is authorized to the terminal unit 3, to realize the shift of session.

The session-information management device 24 deletes the old session identifier information from a management table (management table for managing the session information) managed using the session-information storage section 27, to thereby update the management table. More specifically, the session-information management device 24 deletes the old session identifier from the management table stored in the session-information storage section 27. The service providing unit 2 then shifts to step S113.

The service providing device 21 creates a reply message (message that authorizes provision of the service) in response to the service access request received at step S101. In this case, the service providing device 21 creates the reply message including the new session identifier acquired (received) from the session-information management device 24. The service providing device 21 then outputs the created reply message to the communication section 20. The communications section 20 returns (transmits) the reply message to the terminal unit 3 via the network 1 while using the communication device 20-m2 according to the instruction from the service providing device 21. The service providing device 21 then starts provision of the service to the terminal unit 3 by transmitting the reply message (step S113).

Figure 8:
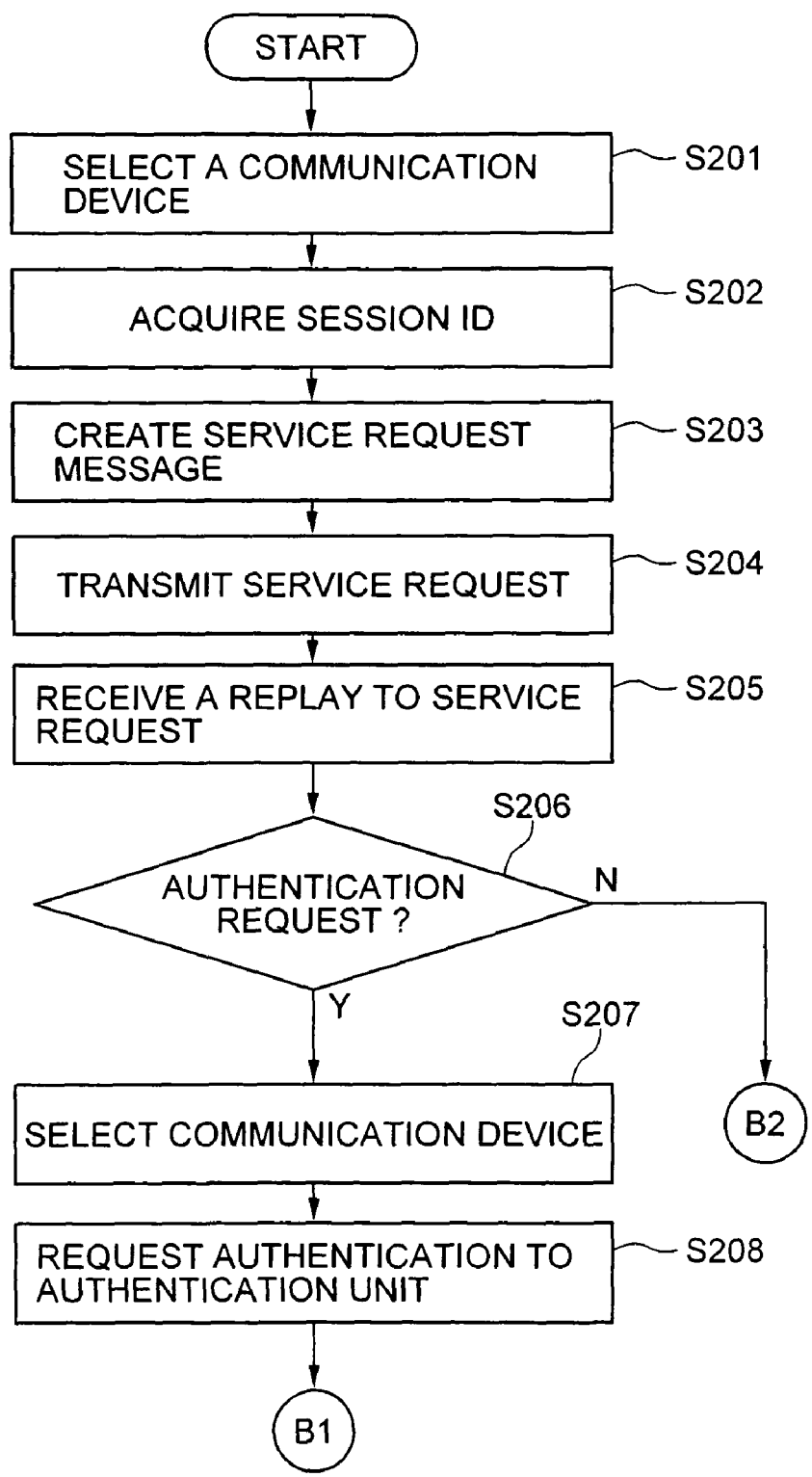
FIG. 8 is a flowchart showing an example of the procedure performed by the terminal unit.
Figure 9:
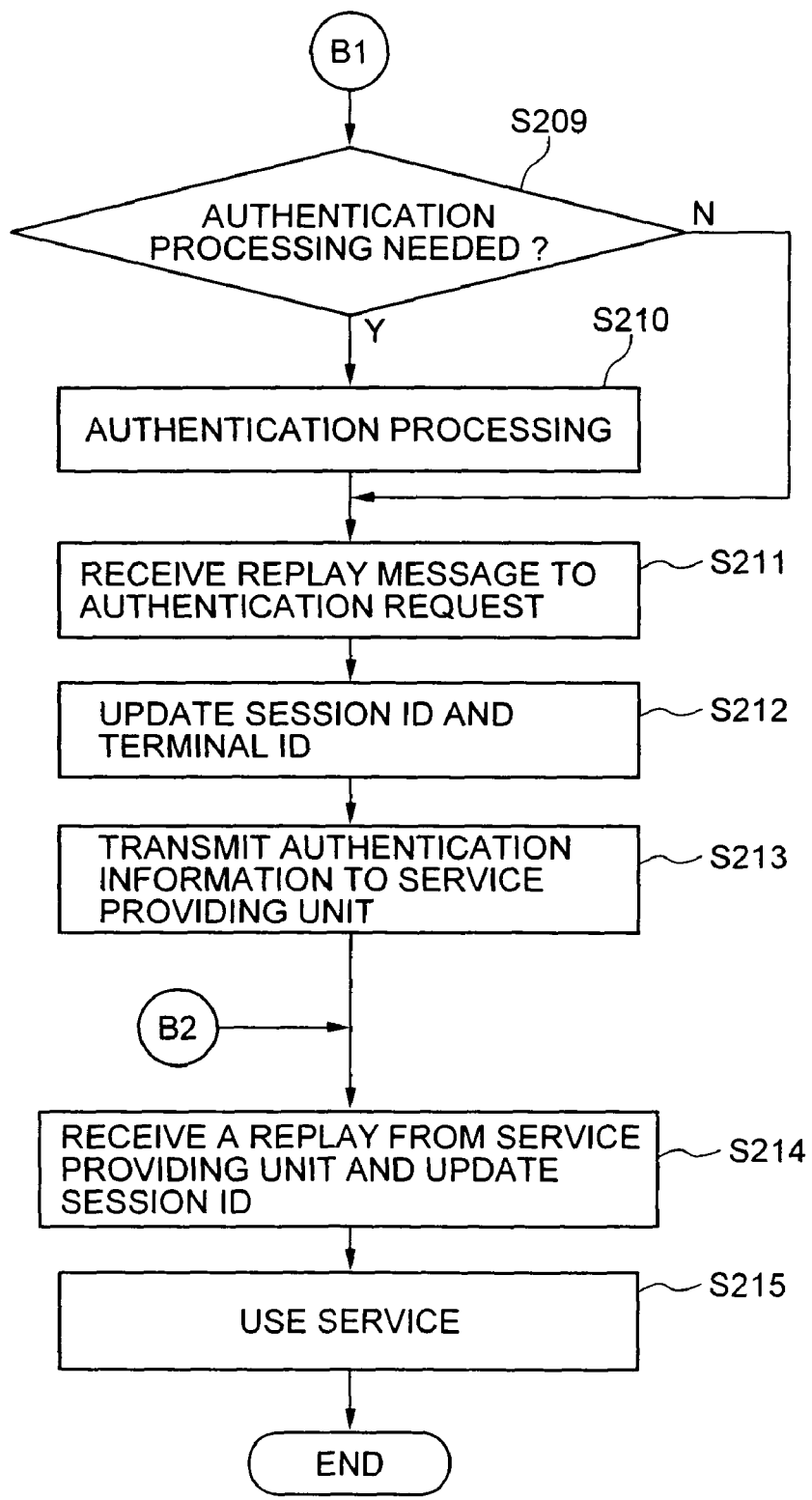
FIG. 9 is a flowchart showing an example of the procedure performed by the terminal unit.

Operation of the terminal unit 3 will be described hereinafter. FIGS. 8 and 9 are flowcharts each showing an example of the procedure performed by the terminal unit. First, the communication-device selection device 31 in the terminal unit 3 selects a suitable communication device 30-$n1$ ($1 \leq n1 \leq$) among the plurality of communication devices in the communication section 30 based on the service providing unit 2 that provides the service desired by the user (step S201). For example, the communication-device selection device 31 selects a communication device 30-$n1$, if an instruction of the access request to the service is input by the user.

The session-information management device 33 retrieves and acquires (extracts) the session identifier information corresponding to the service that is the target for request, from the session-identifier storage section 35 (step S202). The communication device 30-$n1$, upon extracting the session identifier information at step S202 (if the session-identifier storage section 35 stores therein a corresponding session identifier), creates a service request message (message for requesting an access to the service) including the extracted session identifier (step S203). The communication device 30-$n1$ then transmits the created service request message to the service providing unit 2 via the network 1 (step S204).

Subsequently, the communication device 30-$n1$ receives a reply message from the service providing unit 2 via the network 1 (step S205), to analyze the thus received reply message. In this case, the communication device 30-$n1$ investigates (judges) whether or not the reply message received is an authentication request to the authentication unit 4 from the service providing unit 2 (step S206). If it is judged that the reply message received is not an authentication request, the service providing unit 2 shifts to step S214. More specifically, since the terminal unit 3 has established the session with the service providing unit 3 for the user to receive the service, this is the state where the service can be used continuously, whereby the procedure shifts to step S214 without any processing.

On the other hand, if it is judged that the reply message received is an authentication request from the service providing unit 2 to the authentication unit 4, the communication-device selection device 31 selects a communication device 30-$n2$ ($1 \leq n2 \leq N$) suitable for communication with the authentication unit 4 (step S207). For example, the communication-device selection device 31 selects a communication device 30-$n2$ corresponding to the communication protocol used by the authentication unit 4.

The communication device 30-$n2$ creates a message (authentication request message) that requests an authentication with the authentication unit 4 being the destination, based on the reply message received. The communication device 30-$n2$ requests retrieval of the session identifier and terminal identifier, which are stored for the authentication unit 4, to the session-identifier management device 33. The session-identifier management device 33 searches for the session identifier and terminal identifier in response to the request from the communication device 30-$n2$, to extract the session identifier and terminal identifier from the session-identifier storage section 35.

If here exist a session identifier and a terminal identifier (if they are extracted by the session-identifier management device 33), the communication device 30-$n2$ adds the extracted session identifier and terminal identifier to the authentication request message. The communication device 30-$n2$ then transmits the created authentication request message to the authentication unit 4 via the network 1 (step S208), and shifts to step S209.

Subsequently, the communication device 30-$n2$ detects whether or not a message requesting the authentication processing from the user side is transmitted from the authentication unit 4 (step S209). In the present exemplary embodiment, if the authentication unit 4 finished the authentication of the user, and if the authentication information is shared in the authentication-information management unit 5, the authentication unit 4 judges that the authentication of the user is succeeded, without performing the authentication processing again. If the authentication information is not shared yet, the authentication unit 4 creates a message that requires the authentication processing (for example, transmission of credential information) of the user side, and transmits the same to the terminal unit 3.

If it is judged at step S209 that the authentication processing is needed (by receiving a message that requests the authentication processing), the authentication processing device 32 performs a suitable authentication processing imposed by the authentication unit 4 (step S210). In this case, for example, the authentication processing device 32 receives the credential information (for example, user ID and a password) according to operation by the user, and transmits the received credential information to the authentication unit 4 via the network 1 while using the communication section 30. On the other hand, if it is judged that the authentication processing is not needed (by not receiving a message that requests the authentication processing), the terminal unit 3 shifts to step S211 without any processing.

After the authentication processing is finished, the communication device 30-$n2$ receives a reply message to the authentication request message of step S208 from the authentication unit 4 via the network 1 (step S211). The session-identifier management device 33 updates the session identifier stored in the session-identifier storage section 35 based on the session identifier acquired (extracted) from the reply message. More specifically, the session-identifier management device 33 updates the session identifier (authentication-side session identifier) issued by the authentication unit 4. The terminal-identifier management device 34 updates the terminal identifier stored in the terminal-identifier storage section 36 based on the terminal identifier acquired (extracted) from the reply message (step S212).

The communication device 30-$n1$ creates a reply message to the authentication request received from the service providing unit 2 at step S205. The communication device 30-$n1$ then transmits the created reply message to the service providing unit 2 via the network 1 (step S213).

Subsequently, the communication device 30-$n1$ receives a message from the service providing unit 2 via the network 1. The session-identifier management device 33 updates the registered information stored in the session-identifier storage section 35 based on the session identifier information acquired (extracted) from the received message (step S214). More specifically, the session-identifier management device 33 updates the session identifier (service-providing-side session identifier) issued by the service providing unit 2.

If the access request from the terminal unit 3 at step S204 is accepted by the service providing unit 2, the terminal unit 3 starts using the service (step S215). For example, the authentication unit 4 uses the service provided by the service providing unit 2 while transmitting and receiving a variety of information via the network 1 according to operation by the user.

Figure 10:
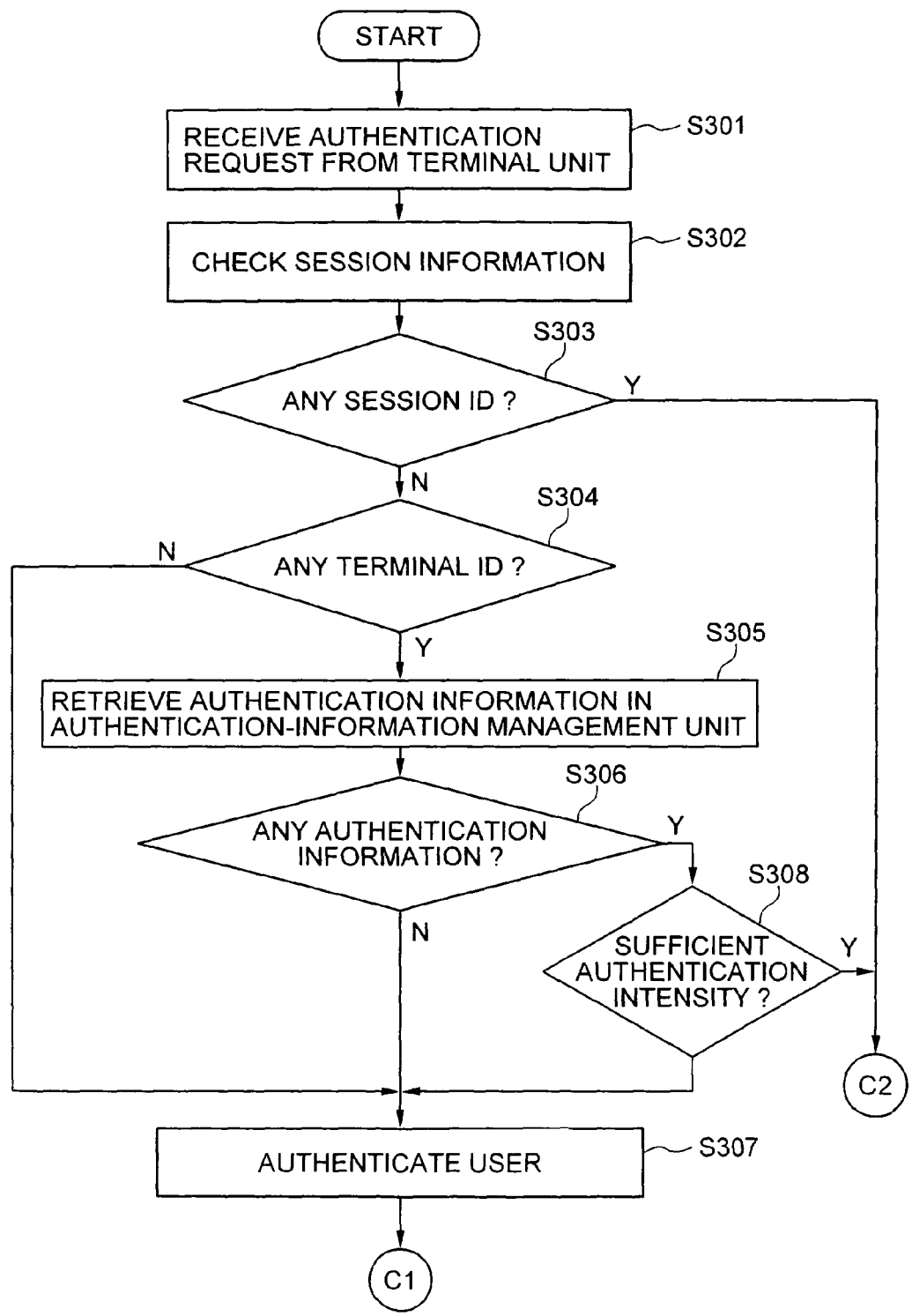
FIG. 10 is a flowchart of the procedure of an example of the authentication processing wherein the authentication unit authenticates the user.
Figure 11:
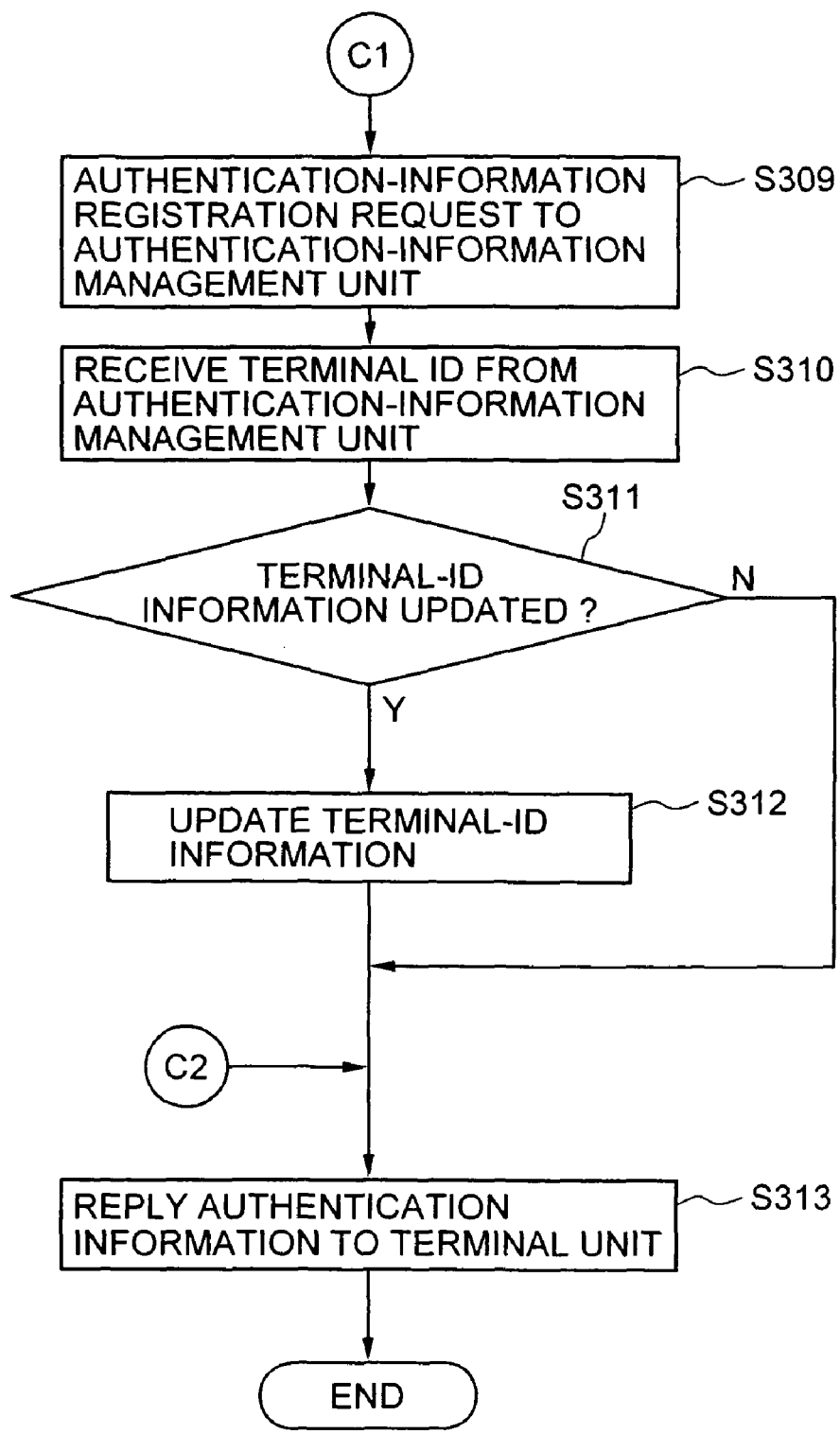
FIG. 11 is a flowchart showing an example of the authentication processing wherein the authentication unit authenticates the user.

Operation of the authentication unit 4 will be described hereinafter. FIGS. 10 and 11 are flowcharts each showing an example of the authentication processing wherein the authentication unit authenticates the user. First, the communication section 41 in the authentication unit 4 usually stays in a state capable of receiving an authentication request from the terminal unit 3 of a user, and receives an authentication request message from the terminal unit 3 via the network 1 (step S301). After receiving the authentication request message, the session-information management device 44 identifies the session identifier of the authentication request message received (step S302), and judges whether or not the authentication request message includes a session identifier (step S303).

If the terminal unit 3 already retains a session identifier with respect to the authentication unit 4 (that is, if the authentication request message includes a session identifier), the session-information management device 44 judges that the user is already subjected to authentication by the authentication unit. The authentication unit 4 then shifts to step S313 without performing the authentication processing from step S304.

On the other hand, if the terminal unit 3 does not yet retain a session identifier with respect to the authentication unit (namely, if a session identifier is not included in the authentication request message), the session-information management device 44 checks (judges) whether or not the terminal identifier that identifies the terminal unit 3 is included in the authentication request message (step S304).

If it is judged that the terminal identifier for identifying the terminal unit 3 is not included, the authentication unit 4 shifts to step S307, in order to authenticate the user. On the other hand, if it is judged that the terminal identifier for identifying the terminal unit 3 is included, the authentication-information management device 42 acquires (extracts) the terminal identifier from the authentication request message. The communication section 41 creates a retrieval request message that requests the authentication-information management unit 5 to retrieve the authentication information of the user by using the terminal identifier as a key. The communication section 41 then transmits the created retrieval request message to the authentication-information management unit 5 via the network 1 (step S305). More specifically, the authentication unit 4 requests retrieval of the authentication information of the user to the authentication-information management unit 5.

After receiving the retrieval request message, the authentication-information management unit 5 searches whether or not the authentication information of the user is already stored therein by using the terminal identifier included in the retrieval request message as a key. The authentication-information management unit 5 then transmits a reply message showing the search result to the authentication unit 4 via the network 1.

The communication section 41 receives the reply message of the authentication management device 5 to the retrieval request, from the authentication-information management unit 5 via the network 1. The communication section 41 checks (judges) whether or not the authentication information of the terminal unit 3 exists (whether or not the authentication-information management unit 5 already stores therein the authentication information), based on the contents of the reply message received (step S306).

If it is judged that the authentication management device 5 does not retain the authentication information of the user using the terminal unit 4, the user-information management device 43 performs an authentication processing for the user (step S307). For example, the user-information management device 43 transmits a request of inputting the credential information (user ID and password) to the terminal unit 3 via the network 1 while using the communication section 41. The user-information management device 43 then authenticates the user by judging whether or not the credential information received from the terminal unit 3 matches with the registered credential information stored in the user-information storage section 45 beforehand.

On the other hand, if it is judged that the authentication management device 5 retains the authentication information of the user, the authentication unit 4 acquires the authentication information of the user that is the target for authentication. In this case, for example, the authentication unit 4 acquires the authentication information by extracting the authentication information included in the reply message received. For example, the authentication unit 4 transmits a transmission request of the authentication information of the user that is the target for authentication to the authentication-information management unit 5, and receives the authentication information via the network 1 from the authentication-information management unit 5.

The authentication unit 4 judges whether or not the authentication intensity shown by the authentication information is sufficient, by comparing authentication information against the authentication intensity requested by the service providing unit 2 that transmitted the request of authentication of the user (step S308). For example, a case is assumed wherein the authentication unit 4 acquires, from the authentication-information management unit 5, the authentication information showing that the user is authenticated using the user ID and password. In this case, if the authentication request message received at step S301 includes information that specifies an authentication using the user ID and password as the authentication intensity, the authentication unit 4 judges a sufficient authentication intensity. If the authentication request message includes information that specifies an authentication using an ID card or PIN (personal identifier number) as the authentication intensity, the authentication unit 4 judges an insufficient authentication intensity.

If it is judged that the authentication intensity shown in the authentication information is a sufficient intensity as compared to the authentication intensity that the service providing unit 2 requests, the authentication unit 4 shifts to step S313 as it is without performing an authentication processing for the user.

On the other hand, if it is judged that the authentication intensity shown in the authentication information is an insufficient intensity as compared to the authentication intensity that the service providing unit 2 requests, it is necessary to authenticate the user by using a suitable authentication device. In this case, the procedure shifts to step S307, wherein the user-information management device 43 compares the credential information received from the terminal unit 3 against the credential information of the user (registered credential information) managed using the user-information storage section 45, to thereby authenticate the user.

Subsequently, the session-information management device 44 issues a new session identifier (authentication-side session identifier) to the terminal unit 3. The authentication-information management device 42 outputs, to the communication section 41, the terminal identifier of the terminal unit 3 and the authentication information showing that authentication of the user is succeeded at step S307. The communication section 41 then creates an authentication-information-registration request message that requests registration of the authentication information, and transmits the created registration request message to the authentication-information management unit 5 via the network 1 (step S309). The communication section 41 creates an authentication-information-registration request message including a terminal identifier and authentication information. In this way, the terminal identifier and authentication information are newly entered into the authentication-information management unit 5.

Registration of the authentication information results in that new authentication information is stored in the authentication-information storage section 54 in the authentication management device 5. The authentication-information management unit 5 then transmits a reply message that shows registration of the authentication information to the authentication unit 4 via the network 1.

The communication section 41 receives the reply message to the authentication-information-registration request message via the network 1 from the authentication management device 5. The session-information management device 44 acquires (extracts from the reply message) the terminal identifier included in the reply message received (step S310).

The session-information management device 44 compares the terminal identifier acquired at step S310 against the terminal identifier of the terminal unit 3 stored therein. The session-information management device 44 then judges whether or not the terminal identifier is updated (that is, the newly acquired terminal identifier matches with the terminal identifier stored in the user-information storage section 45) (step S311).

If it is judged that the terminal identifier is not updated (if the newly acquired terminal identifier matches with the terminal identifier stored in the user-information storage section 45), the authentication unit 4 shifts to step S313 without any processing. On the other hand, if the terminal identifier acquired at step S310 differs from the terminal identifier of the terminal unit 3 stored therein (if it is judged that the terminal identifier is updated), the session-information management device 44 deletes the terminal identifier of the terminal unit 3 stored in the session-information storage section 46. The session-information management device 44 then re-registers the authentication information of the user by using as a key the new terminal identifier newly acquired (step S312). More specifically, the session-information management device 44 updates the terminal identifier, and stores the authentication information of the terminal unit 3 in the session-information storage section 46 in association with the new terminal identifier.

The communication section 41 creates a reply message to the authentication request received at step S301. In this case, the communication section 41 creates the reply message including the terminal identifier, session identifier, and authentication information that are acquired at step S310. The communication section 41 then returns (transmits) the created reply message to the terminal unit 3 via the network 1 (step S313).

Figure 12:
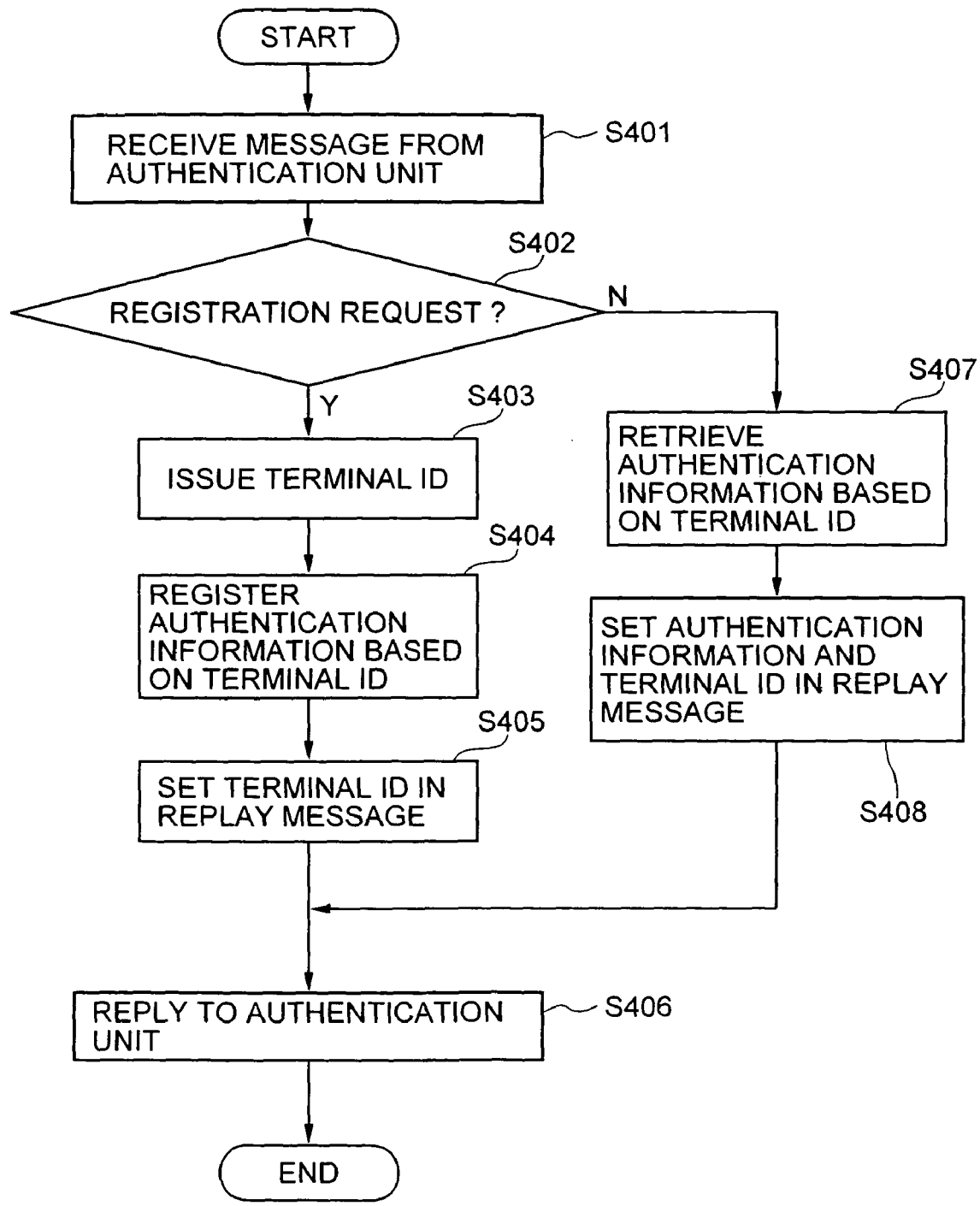
FIG. 12 is a flowchart showing an example of the authentication-information management processing wherein the authentication-information management unit manages the authentication information.

Operation of the authentication-information management unit 5 will be described hereinafter. FIG. 12 is a flowchart showing an example of the authentication-information management processing in which the authentication-information management unit manages the authentication information. First, the communication section 51 in the authentication-information management unit 5 receives a message (retrieval request message or authentication-information-registration request message) from the communication section 41 of the authentication unit 4 via the network 1 (step S401). The communication section 51 then checks (judges) whether the message received is a request of registration of the authentication information (authentication-information-registration request message) or a request of retrieval of the authentication information (retrieval request message) (step S402).

Upon judging a request of registration of the authentication information (authentication-information-registration request message), the terminal-identifier management device 54 issues a terminal identifier (step S403). The terminal-identifier management device 54 then stores the issued terminal identifier in the terminal-identifier storage section 56. The authentication-information registration device 52 uses the issued terminal identifier as a key, to enter the authentication information of the user included in the received message into the authentication-information storage section 55 (step S404). More specifically, the authentication-information registration device 52 stores the authentication information that is the target for registration in the authentication-information storage section 55, in association with the issued terminal identifier.

The communication section 51 creates a reply message to the authentication-information-registration request message, and sets the information of the terminal identifier in the reply message (step S405). More specifically, the communication section 51 creates the reply message including the issued terminal identifier. The communication section 51 returns (transmits) the created reply message to the communication section 41 of the authentication unit 4 via the network 1 (step S406).

On the other hand, if it is judged at step S402 that the communication section 51 received a retrieval request (that is, by receiving a retrieval request message), the authentication-information retrieval device 53 searches whether or not there is authentication information of the user, based on the terminal identifier included in the retrieval request message received (step S407). More specifically, the authentication-information retrieval device 53 judges whether or not the authentication information corresponding to the terminal identifier is stored in the authentication-information storage section 55.

In step S407, the terminal-identifier management device 54 may issue, if needed, a new terminal identifier to the terminal unit 3 of the user, and may update the terminal identifier stored in the terminal-identifier storage section 56.

Subsequently, the communication section 51 creates a reply message to the retrieval request message received. The communication section 51 sets the search-result information of the authentication information of the user (for example, presence or absence of the authentication information and the authentication information extracted by the authentication-information retrieval device 53 from the authentication-information storage section 55), and the terminal identifier (for example, terminal identifier newly issued by the terminal-identifier management device 54) (step S408), in the replay message. More specifically, the communication section 51 creates the reply message including the search-result information and terminal identifier. The communication section 51 then shifts to step S406, wherein the created reply message is returned (transmitted) to the communication section 41 of the authentication unit 4 via the network 1.

As described heretofore, according to the present exemplary embodiment, the authentication-information management unit 5 manages the authentication information of the users authenticated by respective authentication units 4, and allows sharing of the authentication information. The service providing unit 2 can provide a plurality of communication devices 20-1 to 20-M to the same service. The service providing unit 2 manages the terminal unit 3 and the session information independently of the communication devices. More specifically, in the present exemplary embodiment, the service providing unit 2 individually manages the session established between the same and the terminal unit 3 in the distributed authentication system sharing the authentication information.

Due to the above configuration in the present exemplary embodiment, even if a user accesses the service providing unit 2, which is under use by the user while operating a terminal unit, via a different communication system, the session information of the session already established can be suitably shifted. Therefore, the number of times for re-authentication processing requested to the user can be reduced, and the service can be used without interruption, whereby the level of convenience of the user can be raised.

Accordingly, if a service is accessed via a different communication system upon using the service via a terminal unit including a plurality of communication systems, the session information can be shifted without interruption of the service. In addition, since the service providing unit 2 can individually manage the session established between the same and the terminal unit 3, the number of times of processing for the authentication of the user can be reduced for a plurality of services without depending on the communication system, while protecting the privacy information of the user. Although there is a possibility in general that a session hijacking among a plurality of different providers is possible, especially in a distributed authentication system in which the authentication information is shared, the individualized management of the session that is achieved here prevents the session hijacking among the different providers.

In the present exemplary embodiment, the authentication information of the user authenticated by the authentication unit 4 is shared by using the authentication-information management unit 5. Due to this configuration, a single-sign-on is achieved along with the shift of session information, whereby the number of times of operation by the user needed for the authentication processing can be reduced. The authentication unit 4 can acquire registered authentication information only by requesting retrieval of the authentication information to the authentication-information management unit 5. Therefore, it is possible to prevent the communication delay as encountered in searching the authentication unit in the conventional distributed authentication system using the SAML described in Non-Patent Document. Therefore, the user can use a plurality of services in an efficient way.

In the present exemplary embodiment, the terminal-identifier management device 54 in the authentication-information management unit 5 issues a terminal identifier to the terminal unit 3 of a user. This terminal identifier is an identifier only effective during an access from a specific authentication unit 4, and is not notified to the service providing unit 2. Therefore, it is possible to prevent the situation wherein the personal information of the user is traced by correlating the terminal identifier with the history of the use access to the service providing unit 2. Therefore, it is possible to prevent the privacy information of the user from being exposed while strongly resisting the attack aiming for the personal information of the user.

Exemplary Embodiment 2

A second exemplary embodiment of the present invention will be described hereinafter with reference to the drawings. In the present exemplary embodiment, the fundamental configuration of the distributed authentication system is similar to the configuration shown in FIG. 1. In the present exemplary embodiment, the configuration of the service providing units and terminal units is different from the configuration of those shown in the first exemplary embodiment.

Figure 13:
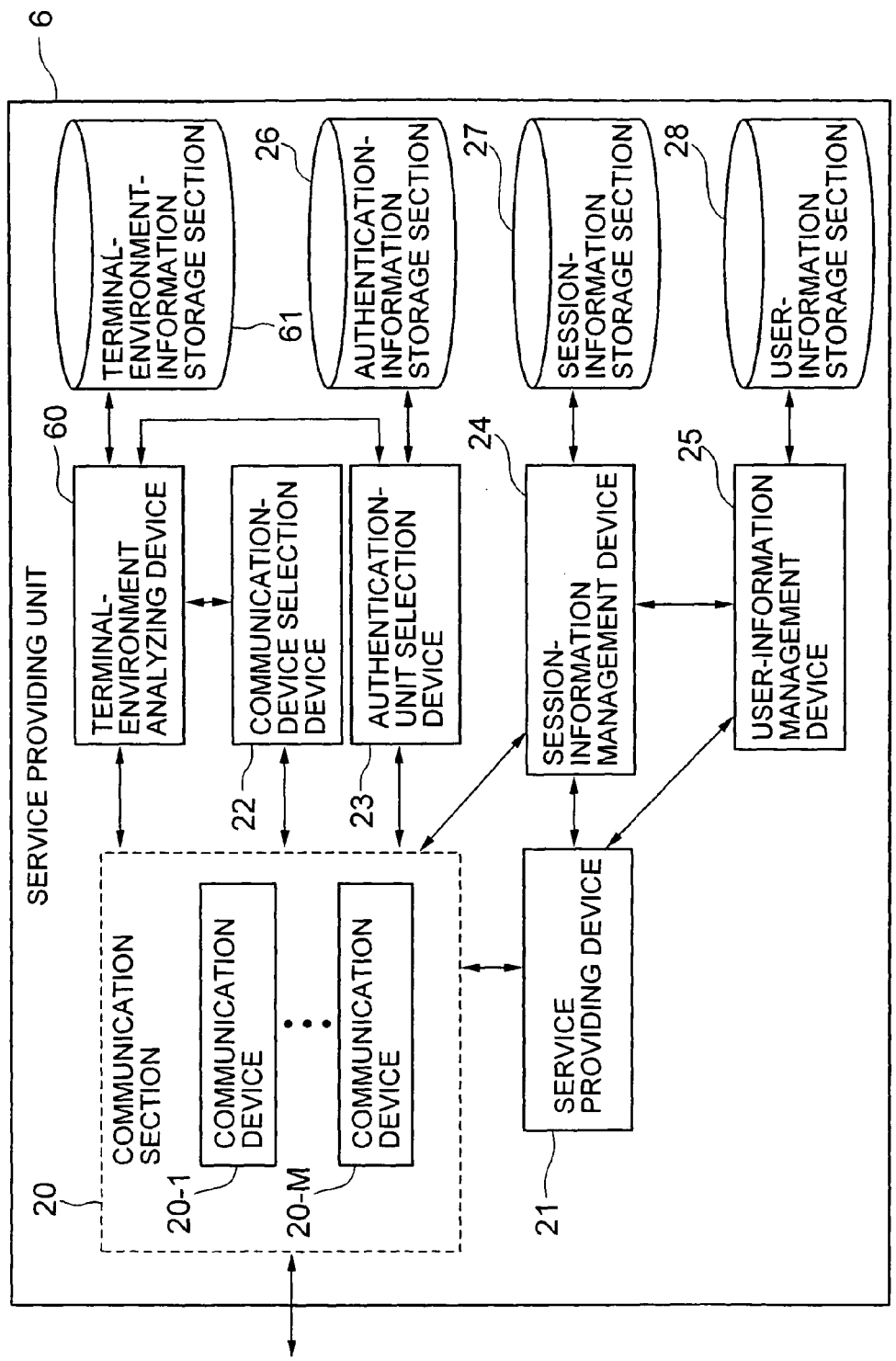
FIG. 13 is a block diagram showing another example of the configuration of the service providing unit.
Figure 14:
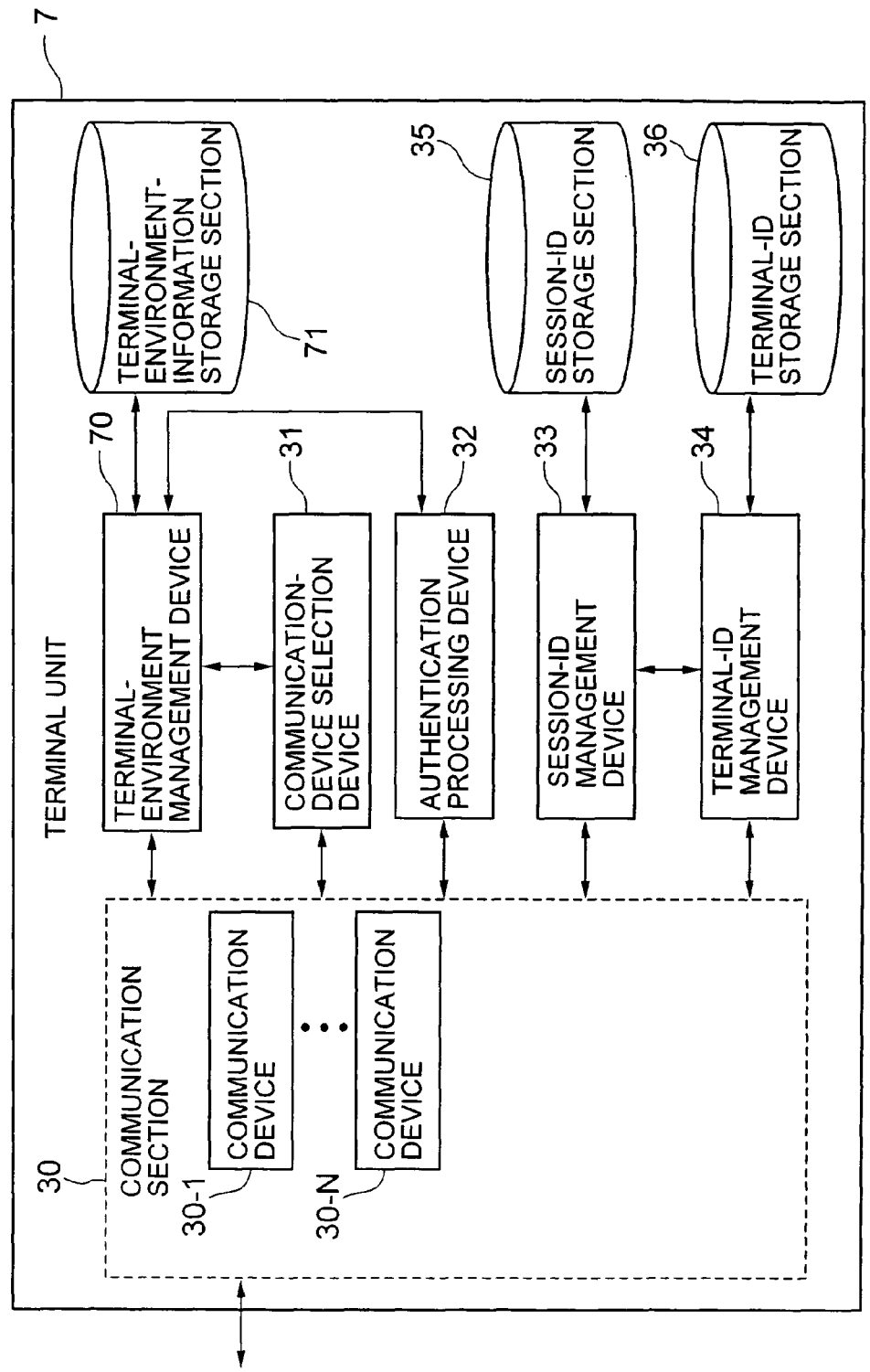
FIG. 14 is a block diagram showing another example of the configuration of the terminal unit.

FIG. 13 is a block diagram showing another configuration example of the service providing unit. FIG. 14 is a block diagram showing another configuration example of the terminal unit. As shown in FIG. 13, the present exemplary embodiment is different from the first exemplary embodiment in that the service providing unit 6 includes, in addition to the configuration of the service providing unit 2 shown in FIG. 2, a terminal-environment analyzing device 60 and a terminal-environment-information storage section 61. The present exemplary embodiment is different from the first exemplary embodiment also in that the terminal unit 7 includes, in addition to the configuration of the terminal unit 3 shown in FIG. 3, a terminal-environment management device 70 and a terminal-environment-information storage section 71, as shown in FIG. 14.

In the terminal unit 7 shown in FIG. 14, the terminal-environment management device 70 is realized, in particular, by the CPU of the information processing terminal that operates according to a program. The terminal-environment management device 70 has a function of acquiring information as to the environment where the terminal unit 7 and user are located, and managing the same by using the terminal-environment-information storage section 71.

The "information as to the environment where the terminal unit 7 and user are located" means, for example, the inherent configuration of the terminal unit 7 (for example, the service providing unit 6 or authentication unit 4 (provider) which the terminal unit 7 can use) or application-dependent information (for example, which application is to be used). It also means, for example, information as to the policy or preference of the user of terminal unit 7 (for, example, which service is preferred). It may means, for example, physical environment where the terminal unit is located, or information of the logical environment etc. on the network (for example, communication protocol available to the terminal unit 7).

In the present exemplary embodiment, the terminal-environment management device 70 acquires (receives) the terminal-environment information from a variety of information providing servers on the network 1 via the network 1 while using the communication device 30. The terminal-environment management device 70 acquires the terminal-environment information by receiving information of the policy or preference of the user according to operation by the user, for example. The terminal-environment management device 70 stores the acquired terminal-environment information in the terminal-environment-information storage section 71 and updates the same, if needed.

The terminal-environment-information storage section 71 is realized, in particular, by a storage unit, such as magnetic disk unit or optical disk unit. The terminal-environment-information storage section 71 stores therein the terminal-environment information acquired by the terminal-environment management device 70. The terminal-environment-information storage section 71 may store beforehand information that shows the inherent configuration of the terminal unit 7, for example, as the terminal-environment information.

In the service providing unit 6 shown in FIG. 13, the terminal-environment analyzing device 60 is realized, in particular, by a CPU that operates according to a program. The terminal-environment analyzing device 60 has a function of analyzing the terminal-environment information (namely, terminal-environment information transmitted from the terminal unit 7) received by the communication section 20. The terminal-environment analyzing device 60 has a function of outputting analysis result of the terminal-environment information to the communication-device selection device 22 or authentication-unit selection device 23. Due to the configuration as described above, the terminal-environment analyzing device 60 assists the communication-device selection device 22 to select a communication device that is optimum for the user, or the authentication-unit selection device 23 to select an optimum authentication unit.

The terminal-environment analyzing device 60 has a function of storing in the terminal-environment-information storage section 61 the terminal-environment information received from the terminal unit 7, and managing the same. For example, the terminal-environment analyzing device 60 manages the terminal-environment information by storing in the terminal-environment-information storage section 61 new terminal-environment information, and updating the terminal-environment information stored in the terminal-environment-information storage section 61, based on the terminal-environment information received.

The terminal-environment-information storage section 61 is realized, in particular, by a storage unit, such as magnetic disk unit or optical disk unit. The terminal-environment-information storage section 61 stores therein the terminal-environment information.

Operation will be described hereinafter. In the present exemplary embodiment, since the processing performed by the authentication unit 4 and authentication-information management unit 5 is similar to the processing of those in the first exemplary embodiment, description thereof will be omitted herein.

Figure 15:
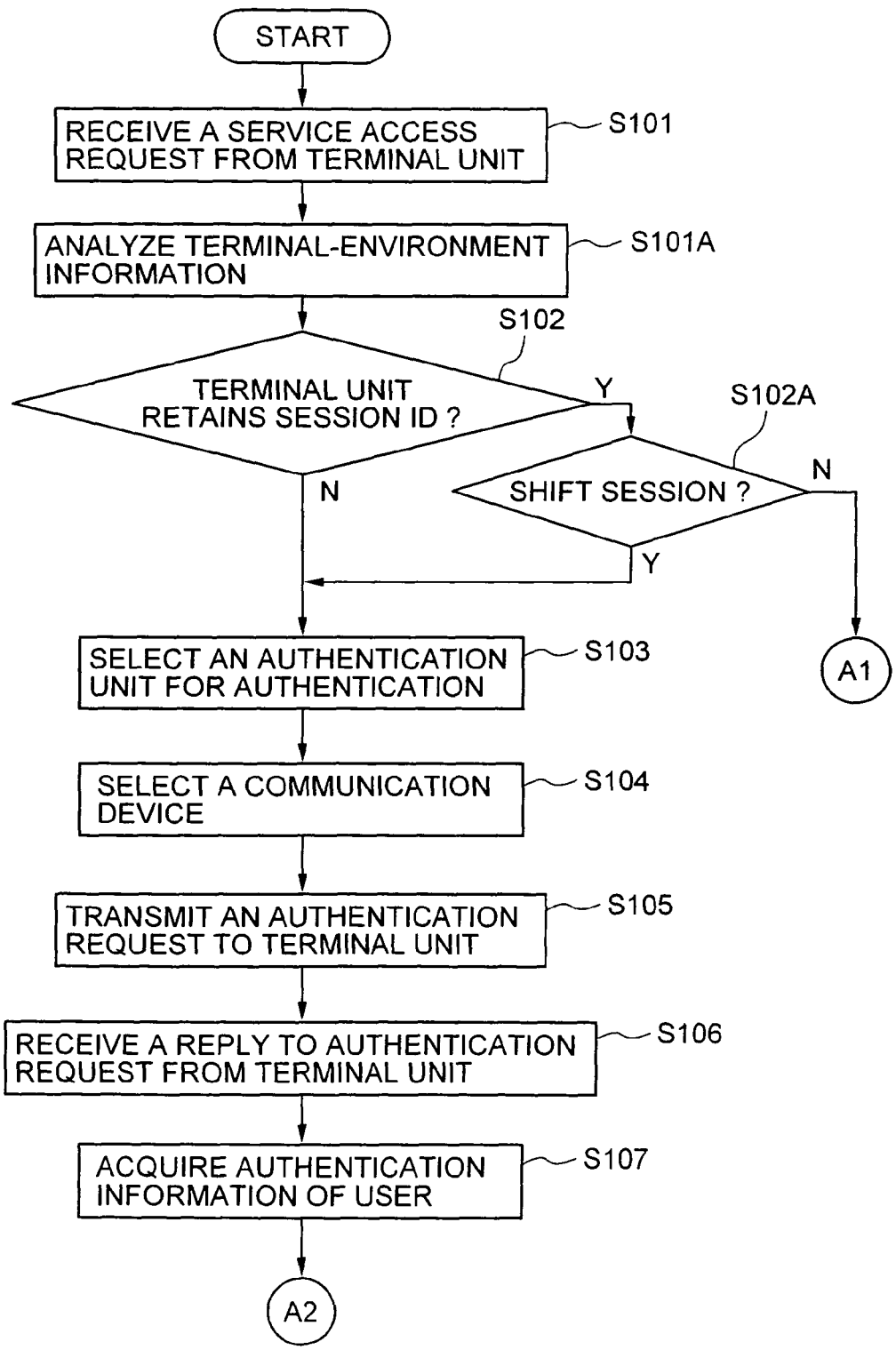
FIG. 15 is a flowchart showing another example of the procedure performed by the service providing unit.

First, operation of the service providing unit 6 will be described. FIG. 15 is a flowchart showing another example of the procedure performed by the service providing unit. In the present exemplary embodiment, upon requesting an access to the service from the terminal unit 7, the communication section 20 receives the terminal-environment information in association with the service access request via the network 1 from the terminal unit 3 (step S101).

In the first exemplary embodiment, selection of the authentication unit 4 as well as selection of the communication device is performed only by judging whether or not the terminal unit 3 has a session identifier. In the present exemplary embodiment, upon receiving the terminal-environment information at step S101, the terminal-environment analyzing device 60 analyzes the terminal-environment information received (step S101A). For example, the terminal-environment analyzing device 60 specifies the current positional information of the terminal unit 7 (for example, latitude and longitude), service providing unit 6 available to the terminal unit 7, authentication unit 4 available to the terminal unit 7, and communication protocol available to the terminal unit 7, based on the terminal-environment information.

Subsequently, the session-information management device 24 checks the session identifier information of the terminal unit 7 (judges whether or not a session identifier is included in the access request message received) (step S102). If it is judged that a session identifier is not included, the service providing unit 6 shifts to processing of step S103. More specifically, the authentication-unit selection device 23 selects an authentication unit 4 suitable for the terminal unit 7 (step S103).

In the present exemplary embodiment, the authentication-unit selection device 23 determines an authentication unit 4 for performing the authentication based on the result of analysis performed by the terminal-environment analyzing device 60 at step S101A. In this case, the authentication-unit selection device 23 determines the authentication unit 4 for performing the authentication in accordance with specific judgment criteria that are specified based on the aspect of security, cost, and performance. For example, the authentication-unit selection device 23 determines the authentication unit 4 for performing the authentication according to the current position of the terminal unit 7, and the authentication unit 4 and communication protocol which are available to the terminal unit 7.

The communication-device selection device 22 selects a suitable communication device 20-*m*2 from a plurality of communication devices included in the communication section 20. In the present exemplary embodiment, the communication-device selection device 22 determines the suitable communication device in the communication section 20 based on the result of analysis performed by the terminal-environment analyzing device 60 (step S104). In this case, the communication-device selection device 22 determines the communication device in accordance with the specific judgment criteria specified based on the aspect of security, cost, and performance. For example, the communication-device selection device 22 determines the communication device according to the current position of terminal unit 7, and the authentication unit 4 and communication protocol which are available to the terminal unit 7.

The terminal-environment analyzing device 60 stores the analyzed terminal-environment information in the terminal-environment-information storage section 61.

On the other hand, even if it is judged at step S102 that a session identifier is included, the terminal-environment analyzing device 60 judges whether or not the session is to be shifted, based on the result of analysis performed at step S101A, with reference to the terminal-environment information of terminal unit 6 already stored in the terminal-environment-information storage section 61 (step S102A). In this case, the terminal-environment analyzing device 60 analyzes (judges) whether the session held now is to be used in succession or another session using a different communication device is to be established.

For example, the terminal-environment analyzing device 60, upon judging that the communication protocol specified by the result of analysis matches with the protocol of the current session, determines that the current session be used in succession (the session is not shifted). If it is judged that the communication protocol does not match, the terminal-environment analyzing device 60 determines another session be established using a different communication device (the session is to be shifted).

If it is determined that the session is not to be shifted, the service providing unit 6 shifts to step S113 without any processing. On the other hand, if it is determined that the session is to be shifted, the service providing unit 6 shifts to the processing of step S103. In step S103, as described before, the authentication-unit selection device 23 determines a suitable authentication unit 4 based on the result of analysis performed by the terminal-environment analyzing device 60 at step S101A. In step S104, the communication-device selection device 22 determines a suitable communication device in the communication section 20 based on the analyzed result of the terminal-environment analyzing device 60. The terminal-environment analyzing device 60 then updates the terminal-environment information stored in the terminal-environment-information storage section 61 by using the analyzed terminal-environment information.

The processings of shifting to step S105 are similar to those processings shown in the first exemplary embodiment.

Figure 16:
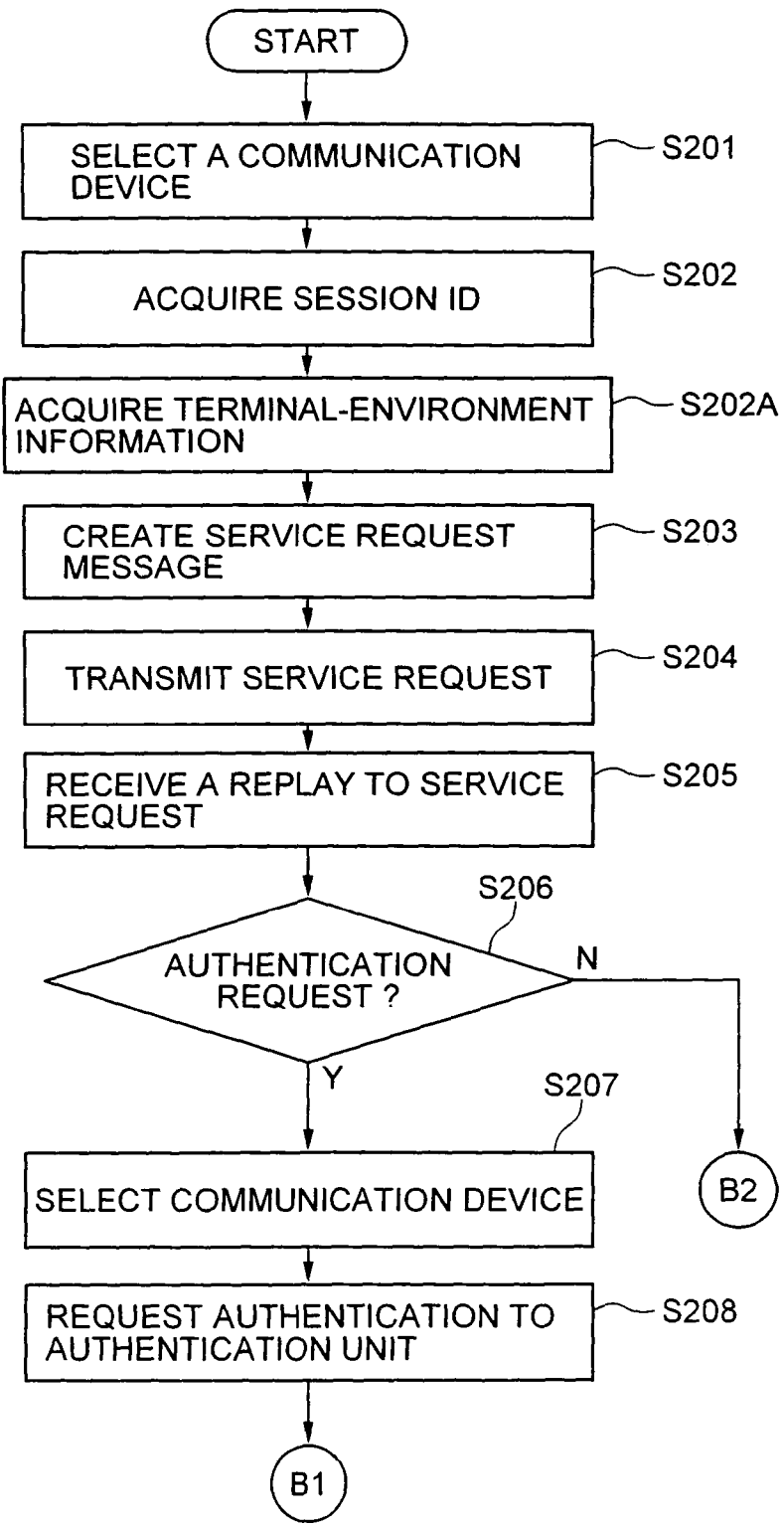
FIG. 16 is a flowchart showing another example of the procedure performed by the terminal unit.

Operation of the terminal unit 7 will be described hereinafter. FIG. 16 is a flowchart showing another example of the procedure performed by the terminal unit. In the present exemplary embodiment, the terminal unit 7 selects a communication device 30-n1 according to a processing similar to step S201 shown in the first exemplary embodiment. The terminal unit 7 acquires a session identifier according a processing similar to step S202.

In the first exemplary embodiment, when the terminal unit 3 creates a service request message directed to the service providing unit 2, if there is a session identifier corresponding to the service providing unit 2 (if it is already stored in the session-identifier storage section 35), a message including the corresponding session identifier is created. In the present exemplary embodiment, the terminal-environment management device 70 first acquires the terminal-environment information (step S202A). In this case, for example, the terminal-environment management device 70 extracts the terminal-environment information stored beforehand in the terminal-environment-information storage section 71. For example, the terminal-environment management device 70 acquires the terminal-environment information by receiving the same from a variety of information providing server via the network 1 while using the communication section 30.

The terminal unit 7 then creates a service request message including the acquired terminal-environment information, in addition to the session identifier (step S203). The processings following to step S204 are similar to those processings shown in the first exemplary embodiment.

As described heretofore, according to the present exemplary embodiment, the terminal-environment information showing preference of the user and environment where the terminal unit 3 is located is transmitted from the terminal unit 3 to the service providing unit 2. The service providing unit 2 then becomes capable of selecting a communication device 20-1 to 20-M and an authentication unit 4 for the authentication, based on the terminal-environment information. Due to the above configuration, an efficient communication device achieving a lowest cost or smallest communication delay can be used in consideration of the preference of the user and the where the terminal unit 3 is located. Therefore, the service can be provided in the environment where the user and terminal unit of the user are located, while using the communication device most suitable to the user.

Embodiment 3

Figure 17:
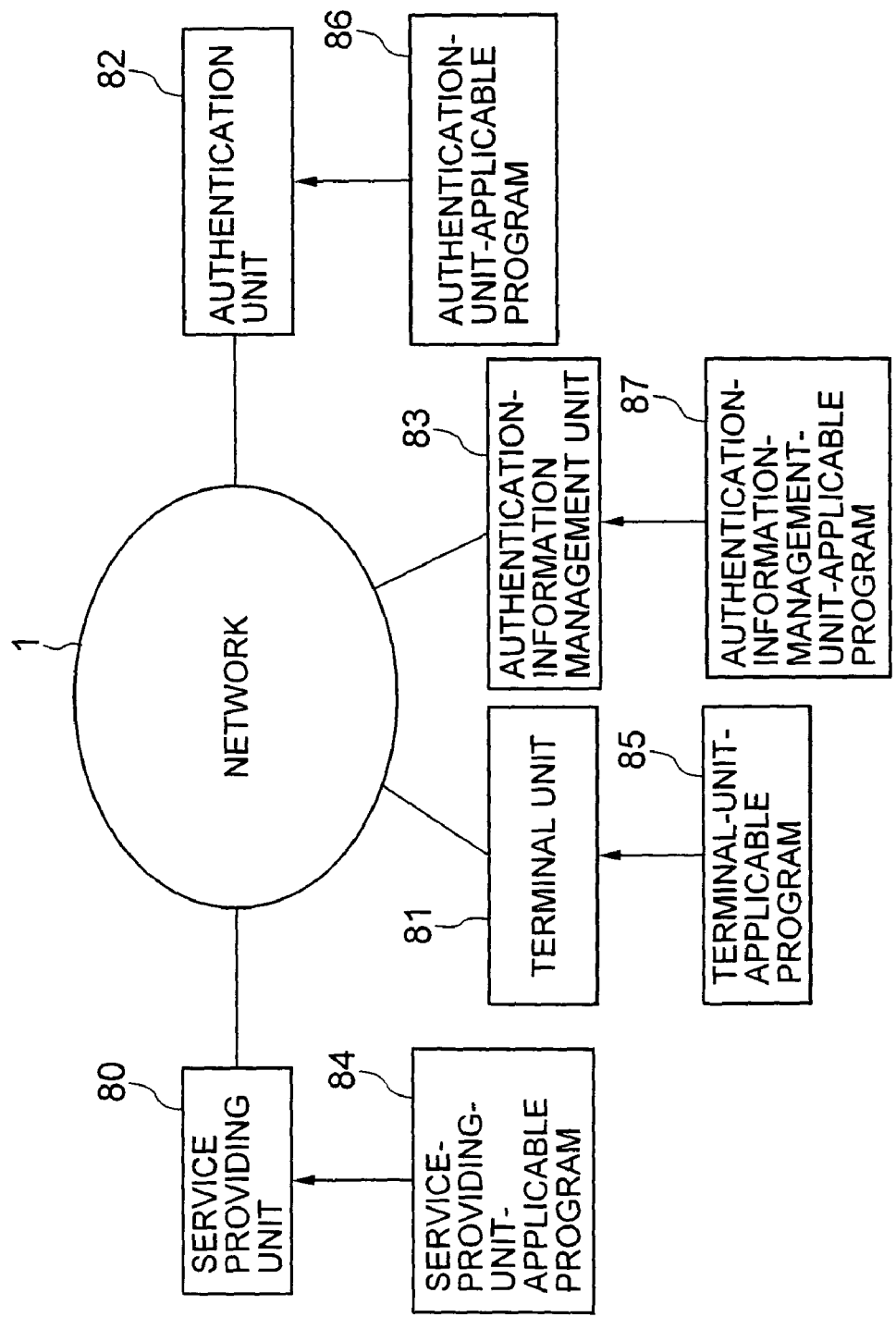
FIG. 17 is a block diagram showing another example of the configuration of the distributed authentication system.

A third exemplary embodiment of the present invention will be described hereinafter with reference to the drawings. FIG. 17 is a block diagram showing another configuration example of the distributed authentication system. As shown in FIG. 17, in the present exemplary embodiment, the distributed authentication system includes a service providing unit 80, a terminal unit 81, an authentication unit 82, and an authentication-information management unit 83, similarly to the first and second exemplary embodiments.

In FIG. 17, a single service providing unit 80 is shown; however, the distributed authentication system may include a plurality of service providing units 80. In addition, a single terminal unit 81 is shown therein; however, the distributed authentication system may include a plurality of terminal units 81. Further, a single authentication unit 82 is shown therein; however, the distributed authentication system may include a plurality of authentication units 82.

In the present exemplary embodiment, the storage unit (not shown) of the service providing unit 80 stores therein a variety of programs for providing a service to the terminal unit 81, or for establishing a session with the terminal unit 81. For example, the storage unit of the service providing unit 80 stores therein a service-providing-unit-applicable program 84 that allows a computer to execute the processings of: generating and storing session information showing a session established between the terminal unit and the own service providing unit upon establishing the session between the terminal unit and the own service providing unit; managing the created session information; and judging based on the managed session information whether or not provision of the service is to be permitted to the terminal unit upon switching by the terminal unit from the communication device used to establish the session to another communication device.

The service-providing-unit-applicable program 84 is a program that is read into the service providing unit 80, to control operation of the service providing unit 80, and to communicate with the terminal unit 81 and authentication unit 82. The service providing unit 80 performs processings in accordance with the service-providing-unit-applicable program 84, to thereby execute processings similar to the processings of the service providing unit 2 or service providing unit 6 shown in the first and second exemplary embodiments.

The storage unit (not shown) of the terminal unit 81 stores therein a variety of programs for using the service provided by the service providing unit 80, and for performing an authentication request processing directed to the authentication unit 82. For example, the storage unit of the terminal unit 81 stores therein a terminal-unit-applicable program 85 that allows a computer to execute: communicating processing of communicating to the service providing unit that provides a service to the terminal unit or the authentication unit that authenticates the user of the terminal unit while using a specific communication system; communication-device selecting processing for selecting a communication device depending on the service providing unit or the terminal unit of the target for communication; authentication processing for authenticating that the user is what he claims to be, by transmitting a specific verification information in response to an authentication processing request from the authentication unit; session-identifier management processing for managing the session identifier that is issued by the service providing unit or authentication unit and identifies the session to be established between the terminal unit and the service providing unit; terminal-identifier management processing for managing the terminal identifier that is issued by the authentication-information management unit and identifies the terminal unit shown in the first or second exemplary embodiment.

The terminal-unit-applicable program 85 is a program that is read into the terminal unit 81, to control operation of the terminal unit 81, and to communicate with the service providing unit 80 and authentication unit 82. The terminal unit 81 performs a processing similar to the processing of the terminal unit 3 or terminal unit 7 shown in the first and second exemplary embodiments by executing the processing in accordance with the terminal-unit-applicable program 85.

The storage unit (not shown) of the authentication unit 82 stores therein a variety of programs for authenticating the user of the terminal unit 81. For example, the storage unit of the authentication unit 82 stores therein an authentication-unit-applicable program 86 that allows a computer to execute: communication processing that for communicating to the service providing unit that provides a specific service to the terminal unit, terminal unit or authentication-information management unit; user-information management processing for creating the authentication information that authenticates the user, based on the personal information of the user of the target for management, authentication-information management processing for creating authentication information based on the authentication result of the user, entering the created authentication information in the authentication-information management unit, performing an authentication request to the authentication-information management unit based on the terminal identifier issued by the authentication-information management unit, to acquire the authentication information; and session-information management processing for issuing the session identifier to the terminal unit of the user that performed the authentication and managing the issued session identifier.

The authentication-unit-applicable program 86 is a program that is read into the authentication unit 82, to control operation of the authentication unit 82, and to communicate with the service providing unit 80, terminal unit 81, and authentication-information management unit 83. The authentication unit 82 performs processings in accordance with the authentication-unit-applicable program 86 to execute processings similar to the processings of the authentication unit 4 shown in the first or second exemplary embodiment.

The storage unit (not shown) of the authentication-information management unit 83 stores therein a variety of programs for sharing the authentication information of users that the authentication unit 82 authenticated. For example, the storage unit of the authentication-information management unit 83 stores therein an authentication-information-management-unit-applicable program 87 that allows a computer to execute the processings of: storing the authentication information, receiving the retrieval request that requests retrieval of the authentication information from the authentication unit via the network; and retrieving the stored authentication information upon receiving the retrieval request.

The authentication-information-management-unit-applicable program 87 is a program that is read into the authentication-information management unit 83, to control operation of the authentication-information management unit 83, and to communicate with the authentication unit 82. The authentication-information management unit 83 performs processing in accordance with the authentication-information-management-unit-applicable program 87, to execute processings similar to the processings of the authentication-information management unit 5 shown in the first or second embodiment.

Example 1

A first example of the present invention will be described hereinafter with reference to the drawings. The distributed authentication system shown in the present example corresponds to the distributed authentication system shown in the first exemplary embodiment.

Figure 18:
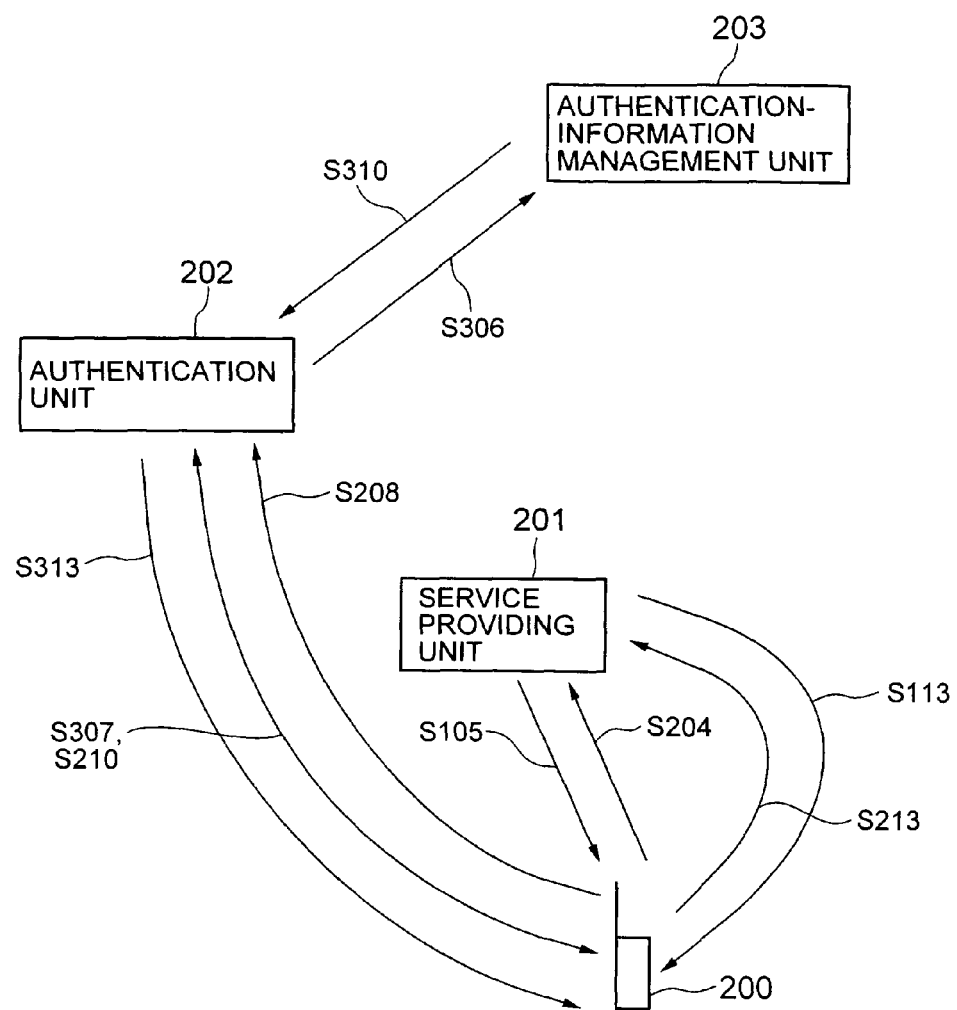
FIG. 18 is an explanatory diagram showing a concrete example of the distributed authentication system.

FIG. 18 is an explanatory diagram showing a concrete example of the distributed authentication system. In the present example, as shown in FIG. 18, the terminal unit 200 includes a communication device connectable to the Internet via a wireless LAN, and a communication device connectable to a portable phone network that a cellular phone service provider manages. The distributed authentication system includes an authentication unit 202 that is accessible via the Internet, and an authentication unit 202 that is accessible via the cellular phone network, as the authentication units.

The distributed authentication system includes, as the service providing unit, a service providing unit 201 that provides a service by using both the communication devices: a communication device for communicating via the Internet, and another communication device for communicating via the cellular phone network.

The user (referred to as John Smith in this example) of the terminal unit 200 has an account identified by user identifiers "john" and "smith" corresponding to the service providing unit 201 and authentication unit 202, respectively. The terminal unit 200 is associated with the service providing unit 201 and authentication unit 202 (for example, the user and each of the service provider of the service providing unit 201 and authentication agent of the authentication unit 202 concluded a contract therebetween beforehand). It is assumed here that the terminal unit 200 does not have executed a sign-on to the service providing unit 201 or authentication unit 202, and does not have established a session between the same and any of the service providing unit 201 and authentication unit 202.

The terminal unit 200 requests an access to the service via the wireless LAN, to the service providing unit 201 in accordance with operation by the user "John Smith" (step S204 of FIG. 8). In this example, the terminal unit 200 does not retain the terminal identifier of the service providing unit 201, and thus the access request message transmitted does not include a terminal identifier. Therefore, the service providing unit 201 transmits to the terminal unit 200 an authentication request message directed to the authentication unit 202 (step S105 of FIG. 6).

The terminal unit 200 receives the authentication request message, and redirects the authentication request message to the authentication unit 202 (Step 208 of FIG. 8). It is to be noted that this message does not include session information and the terminal identifier of the authentication unit 202.

Since the terminal unit 200 did not transmit the message including a session identifier, the authentication unit 202 requests a user-side authentication processing to the terminal unit 200. The terminal unit 200 then performs a suitable authentication processing (for example, transmission of credential information in accordance with input operation by the user) (step S307 of FIG. 10, and step S210 of FIG. 9).

The authentication unit 202 completes the authentication processing and issues authentication information. The authentication unit 202 enters the issued authentication information into the authentication-information management unit 203 (step S306 of FIG. 10, and step S310 of FIG. 11). Under the present circumstances, the authentication-information management unit 203 issues a new terminal identifier in association with the authentication information.

FIG. 19 is an explanatory diagram showing an example of the information managed by the authentication-information management unit 203. As shown in FIG. 19, the authentication-information management unit 203 stores therein Table (list) 210. As shown in FIG. 19, the authentication-information management unit 203 stores therein identifier "Assertion-001" described in the authentication information transmitted from the authentication unit 202, and terminal identifier "ABCD-1000" newly issued, in association with each other.

The authentication unit 202 finishes registration of the authentication information in the authentication-information management unit 203, and issues a new session identifier to the terminal unit 200. FIG. 20 is an explanatory diagram showing an example of the management information managed by the authentication unit 202. As shown in FIG. 20, the authentication unit 202 stores therein Table (list) 211. As shown in FIG. 20, the authentication unit 202 stores therein user "smith" of the authentication unit 202, terminal identifier "ABCD-1000" acquired from the authentication-information management unit 203, and session identifier "IdP202-0001" newly issued to the terminal unit 200, in association with one another.

The authentication unit 202 returns the authentication information including the newly issued session identifier "IdP202-0001" to the terminal unit 200 (step S313 of FIG. 11). The terminal unit 200 transmits the authentication information received from the authentication unit 202, to the service providing unit 201 (step S213 of FIG. 9).

The service providing unit 201 authorizes user "john" to use the service based on the authentication information received from the terminal unit 200, and issues a new session to the terminal unit 200.

FIG. 21 is an explanatory diagram showing an example of the management information managed by the service providing unit 201. As shown in FIG. 21, the service providing unit 201 stores therein Table 212 (list). As shown in FIG. 21, the service providing unit 201 associates user identifier "john" of the service providing unit 201, and the identifier "Assertion-001" and new session identifier "SP201-0001" of the authentication information received from the terminal unit 200, and stores therein the same.

The message (reply message to a service request) which means that the service providing unit 201 permits the use of service by "john" is transmitted to the terminal unit 200 (S113 of the step of FIG. 7). The new session identifier "SP201-0001" is included in this message.

At this stage, user "John Smith" is allowed to use the service provided by the service providing unit 201. The terminal unit 200 manages the session identifier transmitted from the authentication unit 202 in step S313, and the session identifier transmitted from the service providing unit 201 in step S113.

FIG. 22 is an explanatory diagram showing an example of the management information managed by the terminal unit 200. As shown in FIG. 22, the terminal unit 200 stores therein Table (list) 213. As shown in FIG. 22, the terminal unit 200 manages (stores therein) the authentication unit 202, session identifier "IdP202-0001" delivered from the service providing unit 201, and terminal identifier "ABCD-1000" delivered from the authentication unit 202, in association with one another.

In the above description, a case is described wherein a new terminal identifier is created when the authentication unit 202 enters the authentication information of the user into the authentication-information management unit 203. The authentication-information management device 203 may issue the terminal identifier to the terminal unit 200 beforehand depending on the environment of the distributed authentication system. In this case, the terminal identifier may also be included in the message transmitted to the authentication unit 202 at step S208.

It is then assumed that user "John Smith" moves, while carrying the terminal unit 200, to an area which the electric wave of the wireless LAN does not reach after the state where provision of the service is started at step S113 as described above. It is to be noted that user "John Smith" moves to the area where the cellular-phone network of the cellular-phone service provider is available. In this case, although user "John Smith" tries an access for the purpose of using in succession the service of the service providing unit 20-1 that the user has used, change of the communication device is needed.

Figure 23:
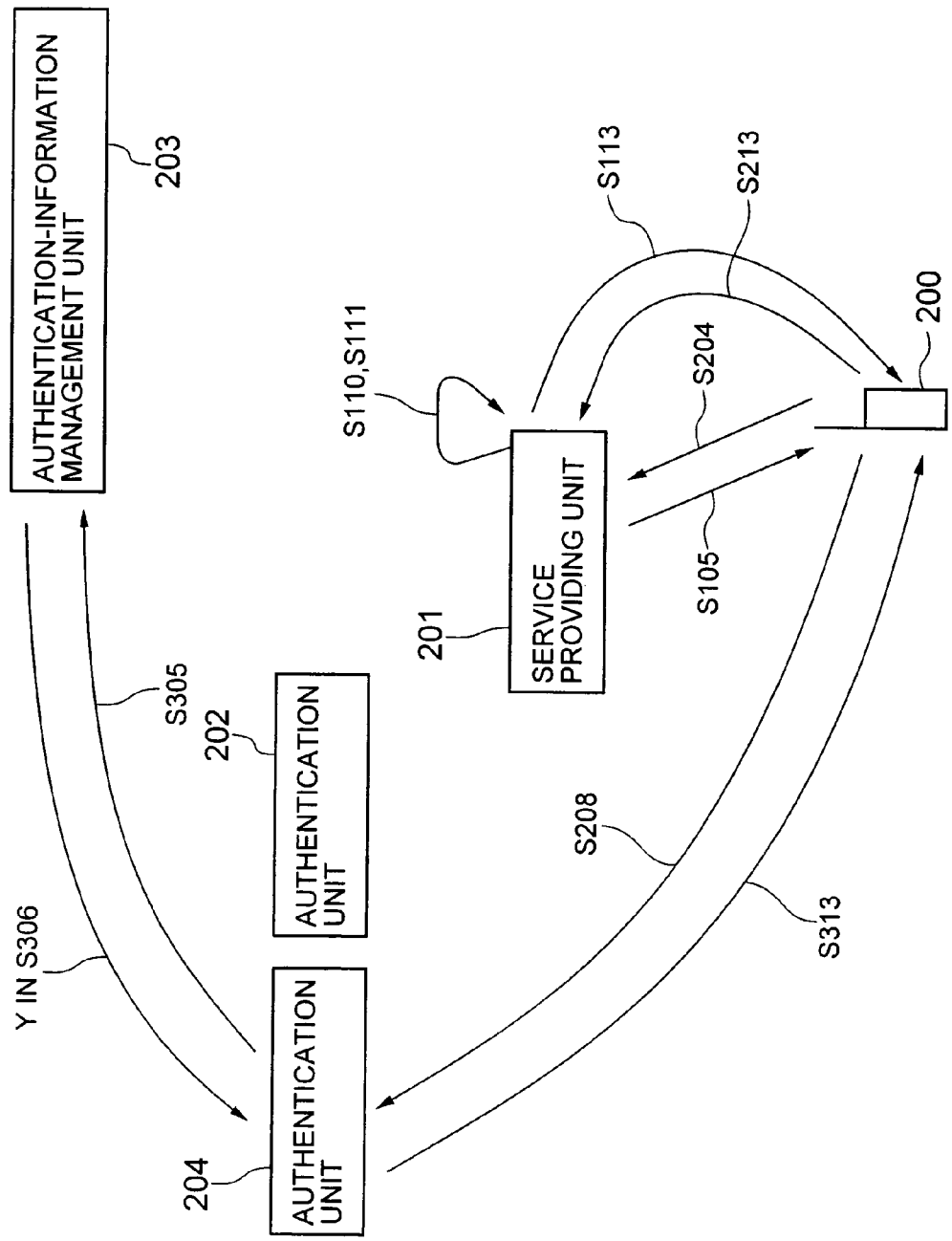
FIG. 23 is an explanatory diagram showing a concrete example of changing the communication device in the case of movement of the terminal unit upon using the service.
Figure 26:
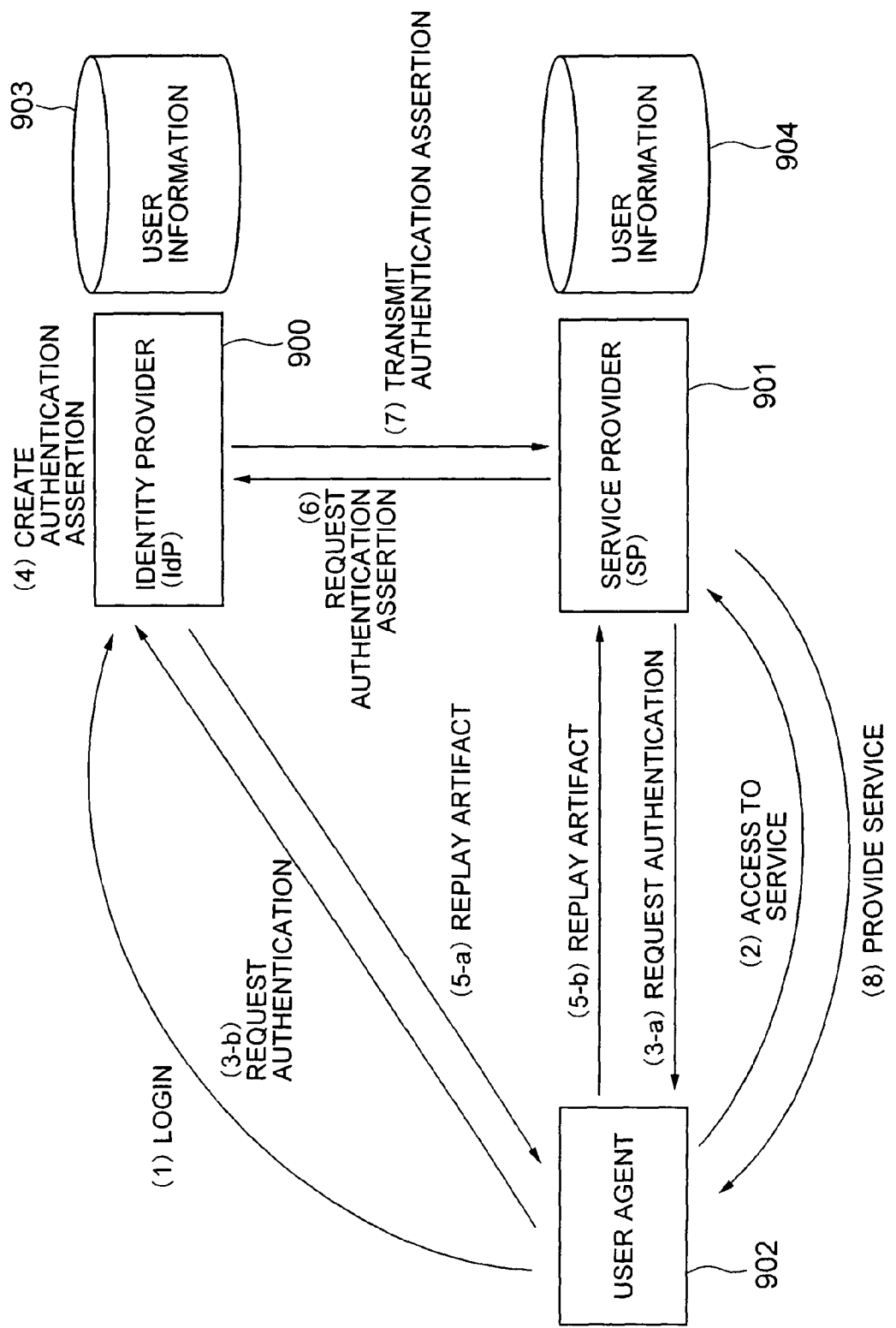
FIG. 26 is an explanatory diagram showing a flow of the messages for achieving a single-sign-on in a conventional distributed authentication system using SAML.

FIG. 23 is an explanatory diagram showing a concrete example of the case where the communication device is changed after the terminal unit 200 moves during using the service. As shown in FIG. 23, the terminal unit 200 accesses the service, which is being used, onto the service providing unit 201 while using the communication device specified in the cellular phone network (step S204 of FIG. 8). In this case, since there is no established session using the cellular phone network, the terminal unit 200 transmits no session identifier information.

The service providing unit 201 transmits, to the terminal unit 200, an authentication request message directed to the authentication unit 204 on the cellular phone network, in order that the terminal unit 200 acquire an authentication (that is, authentication needed for using the cellular phone network) (step S105 of FIG. 6). The terminal unit 200 receives the authentication request message, and redirects the authentication request message to the authentication unit 204 (step S208 of FIG. 8). This message includes terminal identifier "ABCD-1000."

The authentication unit 204 receives the terminal identifier and requests retrieval of the authentication information of the user to the authentication-information management unit 203, by using the received terminal identifier as a key (step S305 of FIG. 10). The authentication-information management device 203 retains therein the authentication information (authentication information authenticated in the authentication unit 202) in association with the terminal identifier, as shown in FIG. 19. Accordingly, the authentication-information management unit 203 returns the retained authentication information to the authentication unit 204 (in the case of YES in step S306 of FIG. 10).

The authentication unit 204 creates new authentication information based on the received authentication information, if an additional authentication of the user is not needed. The authentication unit 204 then transmits the authentication information, terminal identifier and newly created session identifier to the terminal unit 200 (step S313 of FIG. 11).

FIG. 24 is an explanatory diagram showing an example of the management information managed by the authentication unit 204. As shown in FIG. 24, the authentication unit 204 stores therein Table (list) 214. As shown in FIG. 24, the authentication unit 204 stores therein user identifier "smith-2" of user "John Smith" in the authentication unit 204, terminal identifier "ABCD-1000", and session identifier "IdP204-0010" newly issued to the terminal unit 200, in association with one another.

The terminal unit 200 returns to the service providing unit 201 the authentication information received from the authentication unit 204 (step S213 of FIG. 9).

The service providing unit 201 confirms that a session identified by session identifier "SP201-0001" has been established between the same and the terminal unit 200, based on the authentication information issued by the authentication unit 204 and management information on Table 212 of FIG. 21, and performs a shift of session (steps S110 and S111 of FIG. 7).

FIG. 25 is an explanatory diagram showing an example of Table 212 updated along with the shift of session. If the session is shifted as shown in FIG. 25, the service providing unit 201 updates the contents of Table 212, as shown in Table 215. As shown in Table 215, the service providing unit 201 issues new session identifier "SP201-0002" to the terminal unit 200. The service providing unit 201 transmits a reply message including the new session identifier and authorizing the terminal unit 200 to use the service in succession (S113 of the step of FIG. 7).

Example 2

A second example of the present invention will be described hereinafter with reference to the drawings. The distributed authentication system in the present example corresponds to the distributed authentication system shown in the second exemplary embodiment.

In the present example, similarly to the first example, the terminal unit includes a communication device connectable to the Internet via a wireless LAN, and a communication device connectable to a portable phone network that a cellular phone service provider manages. The distributed authentication system includes an authentication unit that is accessible via the Internet, and an authentication unit that is accessible via the cellular phone network, as the authentication units.

The distributed authentication system includes, as the service providing unit, a service providing unit that provides a service by using both the communication devices: a communication device for communicating via the Internet, and another communication device for communicating via the cellular phone network. The terminal unit includes a GPS function that can acquire the geographic positional information of the terminal unit (for example, latitude and longitude), as a terminal-environment management device.

The terminal unit, upon trying to use the service provided by the service providing unit, acquires the current positional information of the terminal unit by using the GPS function. For example, the terminal unit calculates the positional information of the terminal unit based on received GPS signals. The terminal unit transmits, to the service providing unit, a service-use request message that includes the acquired positional information as the terminal-environment information.

The service providing unit receives the service request message, and acquires (extracts) the positional information included in the service request message received from the terminal unit. The terminal-environment analyzing device of the service providing unit acquires by calculation the access network and communication device which provide a lower-cost service based on the positional information, if the terminal unit can use both the wireless LAN and cellular phone network. The service providing unit creates an authentication request message in order to receive an authentication from the communication carrier that provides a cheaper network to the user. The service providing unit transmits the created authentication request message to the terminal unit.

As described heretofore, according to a preferred embodiment of the present invention, the authentication-information management unit manages the authentication information showing a successful authentication of the user, and allows sharing of the authentication information. The service providing unit manages individually the session information to individually manage sessions established between the same and the terminal unit. The individualized management of the sessions thus achieved allows the session information to be shifted without interruption of the service, if a different communication system is used to access the service during using the service by using a terminal unit including a plurality of communication systems.

According to the preferred embodiment of the present invention, the individualized management of the sessions thus achieved allows the session information of the session already established between the terminal unit and the service providing unit to be suitably shifted, even if a different communication system is to be used to access the service upon using the service. Therefore, the user is not requested for re-authentication thereof, whereby use of the service is not interrupted. Accordingly, level of the convenience of the user upon using the service use can be raised.

According to the preferred embodiment of the present invention, sharing of the authentication information by using the authentication-information management unit achieves a single-sign-on along with the shift of session information, whereby the number of times of executing the authentication processing by the user can be reduced. Therefore, it is possible to reduce the number of times of communication and to prevent the communication delay, thereby improving the efficiency for providing the service.

According to a preferred embodiment of the present invention, the authentication information is managed using the terminal identifier that can be effectively updated only when an access from a specific authentication unit and is not notified to the service providing units providing respective services. Thus, correlation of the identifier with the user is difficult to achieve. In addition, a situation can be prevented wherein correlation of the terminal identifier with the access history by the user enables tracing of the personal information of the user. Accordingly, it is possible to strongly prevent the privacy information of the user from being exposed against the attack that aims acquisition of the personal information of the user, whereby confidentiality of the information is improved.

According to a preferred embodiment of the present invention, terminal-environment information showing the preference of the user and environment where the terminal unit is located is transmitted from the terminal unit to the service providing unit. Thus, the service providing unit can select a communication device and an authentication unit for the authentication based on the terminal-environment information. Due to this configuration, a communication device which is cheapest to the user or has a smallest communication delay can be selected. Thus, communication can be performed by selecting a communication device that is most efficient to the user among a plurality of communication devices. Accordingly, the service can be provided using a communication device most suitable to the user in the environment wherein the user and the terminal unit of the user are located.

The distributed authentication system may include an authentication unit (for example, authentication unit 4) that authenticates the user of the terminal unit, and may be such that the authentication unit include an authentication device (for example, realized by user-information authentication device 43) that authenticates the user of the terminal unit to create the authentication information; the authentication-information management unit includes an authentication information storage device (for example, authentication-information management unit 5) that stores therein the authentication information created by the authentication unit.

The distributed authentication system may be such that the service providing unit further includes an authorization-information transmission device (for example, realized by communication section 20) that transmits to the terminal unit via a communication network authorization information (for example, replay message) showing permission of provision of the service, if the service authorization device judges that provision of the service is to be permitted, and the authorization-information transmission device transmits the authorization information including the session information stored in the session-information storage device.

The distributed authentication system may be such that the terminal unit stores in a session-information storage device (for example, realized by session-information storage device 35) the session information included in the authorization information received from the service providing unit; the communication-device selection device, upon changing a communication device after a session is established between the terminal unit and the service providing unit, transmits a service request including the session information stored in the session-information storage device (for example, realized by session-information storage device 35) to the service providing unit via the network; and the service authorization device judges whether or not provision of the service to the terminal unit is to be permitted, based on the session information included in the service request received from the terminal unit.

The distributed authentication system may be such that the service providing unit includes a session-information judgment device (for example, realized by session-information management device 24) that judges whether or not the session information is included in the service request received from the terminal unit, and the service authorization device judges that provision of the service to the terminal unit is permitted if the service-information judgement device judges that the session information is included in the service request.

The distributed authentication system may be such that the service providing unit includes an authentication request device (for example, realized by communication section 20) that transmits an authentication request (authentication request message) requesting execution of an authentication processing to the authentication unit, if the service-information judgement device judges that the session information is not included in the service request; and the service authorization device permits provision of the service to the terminal unit based on a fact that the user of the terminal unit is authenticated by the authentication unit; and the authentication device (5) authenticates the user of the terminal unit based on the authentication request from the service providing unit.

The distributed authentication system may be such that the authentication request device transmits an authentication request to the terminal unit (3) via the network; the terminal unit includes a terminal-side authentication request device (for realized by communication section 30) that transmits a terminal-side authentication request including the session information to the authentication unit via the network, when the authentication request is received from the service providing unit, the authentication unit (4) includes an authentication-side session-information judgment section (for example, realized by authentication-side session-information judgment section 44) that judges whether or not the session information is included in the terminal-side authentication request received from the terminal unit; and the authentication device judges a successful authentication of the user of the terminal unit if the authentication-side session judgment device judges that the session information is included in the terminal-side authentication request.

The distributed authentication system may be such that the authentication unit includes a retrieval request device (for example, realized by communication section 41) that transmits a retrieval request (for example, retrieval request message) requesting retrieval of the authentication information to the authentication-information management unit via the network, if the authentication-side session judgment device judges that the session information is not included in the terminal-side authentication request; the authentication-information management unit includes an authentication-information retrieval device (for example, realized by authentication-information retrieval device 53) that retrieves the authentication information stored in the authentication-information storage device, if the retrieval request is received from the authentication unit; and the authentication device authenticates the user of the terminal unit based on retrieval result of the authentication-information retrieval device.

The distributed authentication system may be such that the authentication device judges a successful authentication of the user of the terminal unit if the authentication-information retrieval device judges that the authentication information is already stored in the authentication-information storage device.

The distributed authentication system may be such that the authentication device: judges whether or not an authentication intensity of the authentication information stored in the authentication-information storage device matches with a specific reference level (for example, whether or not an authentication method using a user ID and password is specified or an authentication method using an ID card and PIN is specified) if the authentication-information retrieval device judges that the authentication information is already stored in the authentication-information storage device; and judges a successful authentication of the user of the terminal unit if it is judged that the authentication intensity of the authentication information matches with the specific reference level; and executes a new authentication processing for the user of the terminal unit if it is judged that the authentication intensity of the authentication information does not match with the specific reference level.

The distributed authentication system may be such that the terminal unit includes a terminal-environment-information management device (for example, realized by terminal-environment-information management device 70) that acquires and manages terminal-environment information showing preference of the user using the terminal unit or an environment where the terminal unit is located; the service providing unit includes a terminal-environment-information analyzing device (for example, realized by terminal-environment-information analyzing device 60) that analyzes the terminal-environment information; the communication-device selection device selects a communication device based on a result of analysis of the terminal-environment information by the terminal-environment-information analyzing device; the authentication-unit selection device selects the authentication unit based on a result of analysis of the terminal-environment information by the terminal-environment-information analyzing device. The "managing the terminal-environment information" means, for example, registering the terminal-environment information into a specific storage section and/or updating the same.

The distributed authentication method may include the steps of acquiring and managing, in the terminal unit, terminal-environment information that shows preference of the user using the terminal unit or environment where the terminal unit is located; analyzing, in the service providing unit, the terminal-environment information; selecting, in the service providing unit, a communication device based on a result of analysis of the terminal-environment information; and selecting, in the service providing unit, an authentication unit based on a result of analysis of the terminal-environment information.

The distributed authentication program may further define a terminal-environment-information management processing that acquires and manages preference of the user or terminal-environment information showing environment where the terminal unit is located.

INDUSTRIAL APPLICABILITY

The present invention is applicable to a distribution authentication system in a distribution system configured on a network system such as the Internet, portable telephone system, fixed telephone system, wireless LAN, and WAN. The present invention is applicable to a program for realizing a distributed authentication system by using a computer.

The invention claimed is:

1. A distributed authentication system for performing a distributed authentication of a user, comprising:
a terminal unit that comprises:
a plurality of network interfaces that communicate in different communication methods; and
a CPU (Central Processing Unit) that controls said plurality of network interfaces;
a service providing unit that comprises:
a network interface that transmits information for providing a specific service to one of said plurality of network interfaces; and
a CPU that controls said network interface of said service providing unit,
wherein:
said network interface transmits a service request requesting provision of a specific service,
said CPU of said service providing unit generates session information identifying a session established between said terminal unit and said service providing unit in response to the service request received by said network interface of said service providing unit when an authentication of the user of said terminal unit is successful,
said network interface of said service providing unit transmits to said one of said plurality of network interfaces authorization information containing the generated session information and showing permission of provision of the specific service,
said CPU of said terminal unit switches said one of said plurality of network interfaces to another of said plurality of network interfaces as a network interface used for communication with said service providing unit and causes said another of said plurality of network interfaces to transmit another service request requesting provision of another specific service and containing the session information contained in the authorization information received by the one of said plurality of network interfaces, and
said CPU of said service providing unit permits said network interface of said service providing unit to provide another specific service to said terminal unit based on the generated session information and the session information contained in the another service request received by said network interface of said service providing unit.

2. The distributed authentication system according to claim 1, further comprising:
an authentication unit which comprises:
a storage unit that stores credential information of the user of said terminal unit;
a network interface that receives credential information from said terminal unit; and
a CPU that causes said network interface of said authentication unit to transmit authentication information showing a successful authentication of the user when the received credential information is the same as the stored credential information,
wherein:
said network interface of said service providing unit transmits an authentication request to said terminal unit when said session information is not included in said another service request,
said another of said plurality of network interfaces of said terminal unit transmits a terminal-side authentication request including said session information to said authentication unit, when said authentication request is received by said terminal unit, and
said CPU of said authentication unit judges a successful authentication of the user of said terminal unit when said session information is included in said terminal-side authentication request received by said network interface of said authentication unit.

3. The distributed authentication system according to claim 2, further comprising:
an authentication-information management unit that comprises:
a storage unit that stores the authentication information including terminal identifier identifying said terminal unit and showing the successful authentication of the user of said terminal unit;
a network interface that receives a retrieval request including a terminal identifier and requesting retrieval of said authentication information; and
a CPU that retrieves the stored authentication information based on the terminal identifier included in the received retrieval request,
wherein:
said another of said plurality of network interfaces of said terminal unit transmits to said authentication unit the terminal-side authentication request further including the terminal identifier identifying said terminal,
said network interface of said authentication unit transmits a retrieval request requesting retrieval of said authentication information including the terminal identifier included in said terminal-side authentication request received from said terminal unit, and
said CPU of said authentication-information management unit judges a successful authentication of the user of said terminal unit if said authentication information is retrieved from said storage of said authentication-information management unit based on the terminal identifier included in the retrieval request.

4. An authentication unit, provided in a distributed authentication system that performs a distributed authentication of a user, said authentication unit comprising:
a storage that stores credential information of the user;
a network interface that receives credential information from a terminal unit the user uses; and
a CPU that causes said network interface to transmit said authentication information showing a successful authentication of a user when the received credential information is the same as the stored credential information,
wherein:
said network interface receives an authentication request including a session information generated when an authentication of the user is successful and identifying a session for providing a specific service, and
said CPU judges a successful authentication of the user when said session information is included in said authentication request received by said network interface.

5. A distribution authentication method for performing a distributed authentication of a user in a distributed authentication system that includes a terminal unit and a service providing unit, said method comprising:
transmitting a service request requesting provision of a specific service by one of a plurality of network interfaces of said terminal unit;
receiving the service request by a network interface of said service providing unit by a CPU (Central Processing Unit) of said service providing unit;
generating session information identifying a session established between said terminal unit and said service providing unit in response to the received service request when an authentication of the user of said terminal unit is successful by said CPU of said service providing unit;

transmitting to said one of said plurality of network interfaces authorization information which contains the generated session information and showing permission of provision of the specific service to said terminal unit by said network interface of said service providing unit;

receiving the authorization information by said one of said plurality of network interfaces;

switching said one of said plurality of network interfaces to said another of said plurality of network interfaces as a network interface used for communication with said service providing unit by said CPU of said terminal unit;

causing said another of said plurality of network interfaces to transmit another service request requesting provision of another specific service and containing the session information contained in the received authorization information by said CPU of said terminal unit;

receiving said another service request by said network interface of said service providing unit; and permitting said network interface of said service providing unit to provide said another service to said terminal unit based on the generated session information and the session information contained in the received another service request by said CPU of said service providing unit.

6. The distributed authentication system according to claim 1, wherein the service providing unit provides a telephone service and an e-mail service via a network in response to a request from the terminal unit.

7. The distributed authentication system according to claim 1, wherein the service providing unit and the terminal unit communicate with each other via a network.

8. The distributed authentication system according to claim 1, wherein the service providing unit performs an information search in response to a request from the terminal unit.

9. The distributed authentication system according to claim 1, wherein the service providing unit provides an information search service that delivers search information to the terminal unit via a network.

10. The distributed authentication system according to claim 1, wherein said session information comprises:
- a session identifier provided to the terminal unit of the user; and
- authentication information of the user issued by an authentication unit.

* * * * *